US011743880B2

(12) United States Patent
Levitsky et al.

(10) Patent No.: US 11,743,880 B2
(45) Date of Patent: Aug. 29, 2023

(54) UE BEAM SWITCHING SYNCHRONIZATION

(71) Applicant: QUALCOMM Incorporated, San Diego, CA (US)

(72) Inventors: Michael Levitsky, Rehovot (IL); Raghu Narayan Challa, San Diego, CA (US); Ruhua He, San Diego, CA (US); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 17/149,536

(22) Filed: Jan. 14, 2021

(65) Prior Publication Data

US 2022/0225311 A1   Jul. 14, 2022

(51) Int. Cl.
*H04W 72/044* (2023.01)
*H04L 5/00* (2006.01)

(52) U.S. Cl.
CPC ......... *H04W 72/046* (2013.01); *H04L 5/0057* (2013.01)

(58) Field of Classification Search
None
See application file for complete search history.

(56) References Cited

U.S. PATENT DOCUMENTS

| | | | | |
|---|---|---|---|---|
| 10,700,760 | B1 * | 6/2020 | Berliner | H04B 17/327 |
| 10,972,168 | B2 * | 4/2021 | Kakishima | H04B 7/0632 |
| 2009/0124290 | A1 * | 5/2009 | Tao | H04B 7/0874 |
| | | | | 455/562.1 |
| 2018/0199328 | A1 * | 7/2018 | Sang | H04B 7/0617 |
| 2018/0227899 | A1 * | 8/2018 | Yu | H04W 72/0413 |
| 2018/0269947 | A1 * | 9/2018 | Levitsky | H04B 7/0695 |
| 2018/0309496 | A1 * | 10/2018 | Lee | H04L 5/0044 |
| 2018/0343043 | A1 * | 11/2018 | Hakola | H04B 7/0617 |
| 2019/0014568 | A1 * | 1/2019 | Nilsson | H04B 7/088 |
| 2019/0182007 | A1 * | 6/2019 | Liu | H04L 5/005 |
| 2019/0239135 | A1 * | 8/2019 | Levitsky | H04B 7/088 |
| 2021/0036800 | A1 * | 2/2021 | Berliner | H04W 36/06 |

OTHER PUBLICATIONS

International Search Report and Written Opinion—PCT/US2021/064976—ISA/EPO—dated May 11, 2022.

* cited by examiner

*Primary Examiner* — Kyaw Z Soe
(74) *Attorney, Agent, or Firm* — The Marbury Law Group

(57) ABSTRACT

A base station may receive from a user equipment (UE) a proactive notification that the UE will perform a beam switch from a first UE beam to a second UE beam. In response, the base station may determine a beam switch slot on which the UE will perform the synchronized beam switch, and perform a link transient mitigation operation for communications with the UE after UE beam switch and until updating channel state information associated with a new UE beam. The base station may then receive from the UE channel state information feedback for a channel associated with the second UE beam, and adjust downlink data transmission parameters to be aligned with the second UE beam based on the received channel state information feedback (CSF). The base station may also adjust uplink data transmission parameters based on a sounding reference signal transmitted by the UE over the second UE beam.

30 Claims, 16 Drawing Sheets

UE BEAM SWITCHING SYNCHRONIZATION

BACKGROUND

In Long Term Evolution (LTE) Fifth Generation (5G) New Radio (NR) and other communication systems utilize millimeter wave (mmWave) frequency bands to provide high bandwidth communication links for user equipment (UE). mmWave frequency bands are susceptible to free-space pathloss and atmospheric absorption. To mitigate these issues, 5G NR mmWave communication systems utilize beamforming techniques to generate highly directional signals, referred to as beams. A transmitting device and a receiving device each tune their respective antenna arrays to form a directional beam.

Currently, beam selection, UE beam reselection, and UE beam tracking procedures are performed autonomously by a wireless device, referred to herein as a user equipment (UE). A base station serving the UE does not receive any information about such UE behaviors or their timing. When the UE performs a beam switch, a physical channel and its characteristics and capacity change, and some transmit parameters used by the base station and the UE may no longer be optimal and may not be consistent with a new channel obtained after the UE beam switch for a period of time until updated channel state information (CSI) is available, causing a link transient that may degrade communication link performance.

SUMMARY

Various aspects include systems and methods performed by base stations and UE for synchronizing or coordinating UE beam switching and performing post-UE-beam switching link transient mitigation. Some aspects may include receiving from a UE via a serving beam a proactive notification that the UE will perform a beam switch from a first UE beam to a second UE beam, determining based on the received notification a UE beam switch slot on which the UE will perform the beam switch, performing from the beam switch slot a link transient mitigation operation for communications over a serving beam with the UE, receiving from the UE channel state information feedback (CSF) for a channel associated with the second UE beam, and adjusting data communication parameters to be aligned with the channel associated with the second UE beam based at least in part on the received CSF.

Some aspects may include stopping performance of the link transient mitigation operation for communications over the serving beam with the UE after receiving the CSF from the UE. In some aspects, performing from the UE beam switch slot the link transient mitigation operation for communications over the serving beam with the UE may include decreasing a modulation and coding scheme (MCS) for communications with the UE. In some aspects, performing from the UE beam switch slot the link transient mitigation operation for communications over the serving beam with the UE may include increasing an MCS margin for outer link adaptation loop for communications with the UE. In some aspects, performing from the UE beam switch slot the link transient mitigation operation for communications over the serving beam with the UE may include using single layer transmissions for communications with the UE. In some aspects, performing from the UE beam switch slot the link transient mitigation operation for communications over the serving beam with the UE may include performing the link transient mitigation operation for communications with the UE until the data transmission parameters are adjusted based on the received CSF or based on the received SRS associated with the channel obtained with the second UE beam.

Some aspects may include allocating resources for a channel state indicator reference signal (CSI-RS) during the UE beam switch slot or during a next-available downlink slot, and transmitting to the UE information scheduling the CSF, in which the CSF is based on the CSI-RS. In such aspects, adjusting data communication parameters to be aligned with the channel associated with the second UE beam based on the received CSF may include avoiding scheduling downlink data transmissions to the UE starting from the UE beam switch slot until the data transmission parameters are adjusted based on the received CSF.

Some aspects may include transmitting to the UE information scheduling an aperiodic sounding reference signal (SRS) transmission during the UE beam switch slot or during a next-available uplink slot, and receiving the SRS from the UE. Such aspects may include adjusting parameters for uplink data transmissions from the UE over the second UE beam obtained after the UE beam switch based on the SRS, and avoiding scheduling uplink data transmissions from the UE from the UE beam switch slot until after adjusting parameters for the uplink data transmissions from the UE over the second UE beam.

Some aspects may include transmitting to the UE information scheduling an aperiodic tracking reference signal (TRS) transmission during the UE beam switch slot or during a next-available downlink slot to enable the UE to refine an estimation of channel characteristics of the channel associated with the serving beam obtained after the UE beam switch, and transmitting the aperiodic TRS to the UE according to the scheduling information. In some aspects, determining based on the received notification a UE beam switch slot on which the UE will perform the beam switch may include determining the UE beam switch slot based on a slot in which the base station receives the notification that the UE will perform a beam switch and a slot offset. Some aspects may include performing a P2 beam management procedure for beam refinement of the serving base station beam after the UE beam switch to the second UE beam and beginning from the UE beam switch slot. In various embodiments, the UE beam switch slot may be an uplink or downlink slot. In some embodiments, resources for the CSI-RS, TRS and/or P2 may be scheduled on a first downlink slot available after the UE beam switch. In some embodiments, resources for the SRS may be scheduled in a first uplink slot available after the UE beam switch.

Further aspects include a base station having a processor configured to perform one or more operations of any of the methods summarized above. Further aspects include processing devices for use in a base station configured with processor-executable instructions to perform operations of any of the methods summarized above. Further aspects include a non-transitory processor-readable storage medium having stored thereon processor-executable instructions configured to cause a processor of a base station to perform operations of any of the methods summarized above. Further aspects include a base station having means for performing functions of any of the methods summarized above. Further aspects include a system on chip for use in a base station and that includes a processor configured to perform one or more operations of any of the methods summarized above.

Various aspects include systems and methods performed by UEs for UE beam switching synchronization and post-UE-beam switching link transient mitigation. Some aspects may include determining that a UE beam switch is required, sending to a base station a proactive notification that the UE will perform a beam switch from a first UE beam to a second UE beam in response to determining that a UE beam switch is required, performing the beam switch from the first UE beam to the second UE beam on a UE beam switch slot, receiving from the base station control information allocating CSI-RS resources on the UE beam switch slot for CSF for a channel associated with the second UE beam, receiving from the base station an aperiodic CSI-RS using the second UE beam, determining the CSF including information about the channel associated with the second UE beam based on the CSI-RS, transmitting the CSF evaluation to the base station using the allocated CSI-RS resources, and receiving from the base station an instruction to adjust data communication parameters to be aligned with the channel associated with the second UE beam based at least in part on the transmitted CSF.

Some aspects may include receiving from the base station information scheduling an aperiodic sounding reference signal (SRS) transmission during the UE beam switch slot or during a next-available uplink slot, transmitting the SRS to the base station, and receiving from the base station an instruction to adjust data communication parameters for uplink data transmissions on the second UE beam based on the SRS. Some aspects may include receiving from the base station information scheduling an aperiodic tracking reference signal (TRS) during the UE beam switch slot or during a next-available downlink slot, receiving the TRS according to the information scheduling the TRS, and refining an estimation of channel characteristics of a channel associated with the serving beam obtained after the UE beam switch to the second UE beam.

Further aspects include a UE having a processor configured to perform one or more operations of any of the methods summarized above. Further aspects include processing devices for use in a UE configured with processor-executable instructions to perform operations of any of the methods summarized above.

Further aspects include a non-transitory processor-readable storage medium having stored thereon processor-executable instructions configured to cause a processor of a UE to perform operations of any of the methods summarized above. Further aspects include a UE having means for performing functions of any of the methods summarized above. Further aspects include a system on chip for use in a UE and that includes a processor configured to perform one or more operations of any of the methods summarized above.

DETAILED DESCRIPTION

Figure 1:
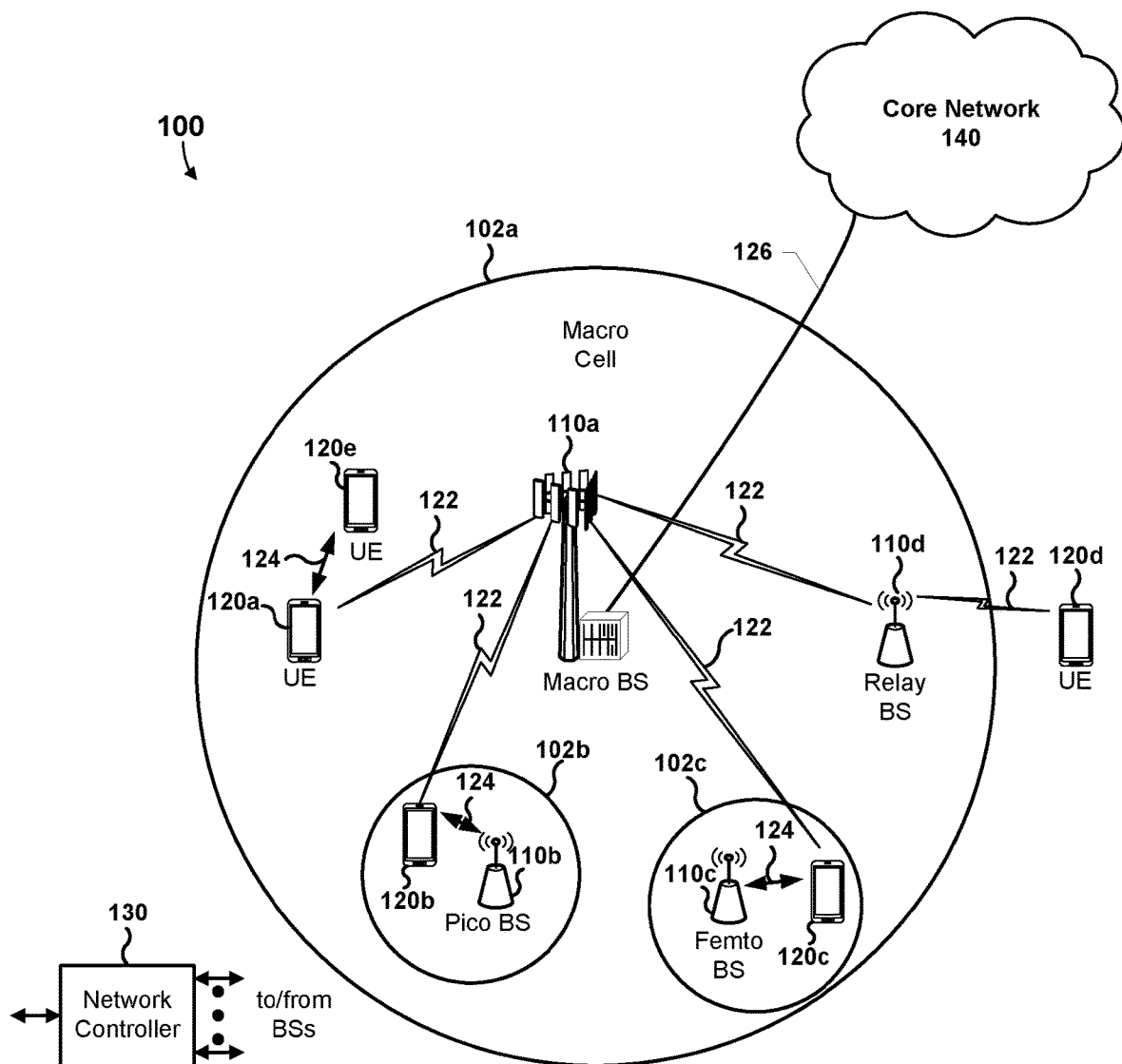
FIG. 1 is a system block diagram illustrating an example communications system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include systems and methods for synchronizing UE beam switching between the UE and a base station to improve communication between the UE and the base station serving (i.e., in communication with) the UE by mitigating a link transient arising from a beam switch performed by the UE. In various embodiments, the UE may send to the base station a proactive notification that the UE will perform a beam switch. Based on the notification, the base station may perform one or more link transient mitigation measures. Further, the base station and/or the UE may send to the other device information and/or instructions to enable rapid adjustment of data communication parameters for a new composite serving beam obtained after UE performs the beam switch.

Various embodiments may improve communication link stability and decrease a probability of beam failure or communication link failure. Various embodiments may improve beam tracking capability and result in correspondingly higher link efficiency. Various embodiments may improve mobility support for mmWave communications.

The term "user equipment" ("UE") is used herein to refer to any of a variety of wireless devices, including for example, wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single UE. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a UE and/or subscription on a UE. The techniques described herein may be used for various wireless communication networks, such as Code Division Multiple Access (CDMA), time division multiple access (TDMA), FDMA, orthogonal FDMA (OFDMA), single carrier FDMA (SC-FDMA), global system for mobile communications (GSM) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), Institute of Electrical and Electronics Engineers (IEEE) 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

5G NR mmWave communication systems utilize beamforming techniques to transmit and receive highly directional beams. An optimal combination of transmit and receive beams may be determined by the system, and the combination is utilized as a composite beam (sometimes referred to as a serving beam) for transmission of control and data signals (e.g., via a physical downlink control channel (PDCCH) and/or a physical downlink shared channel (PDSCH). To enable efficient and reliable communication over time, the optimal combination of transmit and receive beams may be adaptively identified and tracked by the system.

Currently, beam selection, beam reselection, and beam tracking procedures are performed autonomously by a UE. A base station serving the UE does not receive any information about such UE behaviors or their timing. However, every time the UE performs a beam switch, a physical channel and its characteristics and capacity change. Accordingly, when a UE performs a beam switch, transmit and receive parameters of the base station and the UE may be mismatched for a period of time, some transmit parameters of the base station and the UE that are in use may no longer be optimal and may not be consistent with the new channel obtained after UE beam switch for a period of time until updated CSI information is available, causing a link transient. For example, pervious transmit parameters may not be aligned with a new channel, and previously known CSI may be invalidated by the UE beam switch. Communication link performance may be degraded during the link transient.

Channel state information (CSI) may be used to determine channel conditions and to assist in link adaptation procedures for the serving beam to maintain reliable and efficient communication between the base station and the UE. For a downlink portion of the communication link, the UE may provide to the base station channel state information feedback (CSF), which may include, for example, a rank indicator (RI), a pre-coding matrix indicator (PMI), a channel quality indicator (CQI), and/or other information. The base station may use the CSF to perform one or more link adaptation operations.

However, when a UE performs a beam switch, physical channel characteristics and capacity may change for both uplink and downlink portions of the communication link. Previously reported CSF may no longer be valid for the new composite beam (i.e. after UE changes its beam). As a result, for a time period after the UE performs the beam switch until the UE sends a new, updated CSF report to the base station that allows to adjust transmission parameters for the new channel obtained in downlink and associated with a new composite (serving) beam, communication link performance may be degraded due to the mismatch between the outdated CSF and the new channel state information. Even when the UE is not highly mobile (i.e., even in case of low UE mobility), a UE beam switching rate may still be significant because of UE rotations and UE environment changes. Every UE beam change can potentially degrade communication link quality (i.e., reliability) for some time duration (e.g., a transient period), or even cause a link failure event for the link in some extreme cases. For example, due to a PMI mismatch, the MCS may become unreliable. In some cases, the base station may perform an outer link adaptation loop operation and/or decrease the MCS in order to quickly recover from the bad link reliability conditions; however, if such steps are not performed quickly enough (e.g., typically an outer link adaptation response has some latency) this scenario may result in a communication link failure or a beam failure event. In case of link failure, the UE may need to reconnect to the communication network. In some cases, an RI (rank indicator) mismatch may lead to a communication link failure. For example, if an RI=2 was used before the UE beam switch, but the resulting channel after the UE beam switch allows only RI=1 (e.g., a high correlation exists between two polarizations received by the second device beam or only a single polarization is properly received over the second UE beam), and an RI=1 should be used after the UE beam switch (e.g., reflecting a stronger Reference Signal Receive Power (RSRP) characteristic of the second UE beam, but a lower rank), the network may be unable to transmit both streams over channel having RI=1. These and other issues may arise from non-synchronous UE beam switching that may be followed by a potential link transient or temporary link reliability problems.

As another example, the UE may perform beam selection and tracking based on synchronization signal block (SSB) signals. In some cases, for example for P3 beam management operations, the UE may utilize a special beam management channel state indicator reference signal (CSI-RS). According to current technical specification definitions, beam management (including UE beam selection and tracking) is typically based on Reference Signal Receive Power (RSRP) criteria using single receive port reference signals. Beam management CSI-RS signals for P3 operations may be allocated with a single port (two-port allocation is also permitted, but typically is not used) SSB signals may utilize a single port. Millimeter wave signals may use both horizontal and vertical polarizations that are typically well separated and result in a rank=2 channel, and two layer transmission (i.e., the maximum for mmWave signals) is more likely for most of UEs (for example, where a signal-to-noise ratio (SNR) is greater than a threshold SNR). In some cases, depending on the selected beam (or the antenna modules used), it may be possible for a UE to receive a stronger beam (i.e., having a higher RSRP) that has only single dominating polarization or strongly correlated polarizations that only allows an RI=1 channel.

When a UE performs a UE beam switch, the new beam (i.e., the second beam) most likely has a different and/or more suitable PMI compared to the one that is currently used (or known) based on the last CSF update. However, since the base station is unaware that the UE has performed the beam change, the base station may continue to use a PMI and RI selected for a previous beam (i.e., the old UE beam or first UE beam). This mismatch may cause downlink quality degradation (referred to herein as a link transient) at least until the next occasion in which the UE reports CSF to the base station. Similarly, the mismatch may cause a link transient in the uplink portion of the communication link at least until a next occasion for the UE to transmit a sounding reference signal (SRS) to the base station over the new UE beam (the second UE beam). Where the base station and UE utilize two-layer communication, a PMI mismatch may introduce a higher sensitivity than in the case of single layer transmission. In the event that the new composite beam (i.e., obtained with the second UE beam) has a rank indicator of one (i.e., RI=1), even if the new beam has a higher RSRP, link transient severity maybe even higher, particularly when downlink data communications are performed with two-layer communication (for example, based on the old CSF report).

Various embodiments include methods and systems for mitigation of the negative impact of a link transient that may accompany a UE beam switch. In some embodiments, the methods may be applied together with, as part of, or related to a P3 beam management procedure. Alternatively or additionally, UE procedures for beam selection, beam refinement, and beam tracking may be performed using synchronization signal block (SSB) resources.

In various embodiments, a UE beam management algorithm executing on the UE may determine that a UE beam switch is required. For example, the UE may determine that there is a superior beam (a second UE beam) to a currently-utilized serving beam (a first UE beam). In response, the UE may send to the base station (e.g., via a serving beam) a proactive indication that the UE will perform a beam switch from the first UE beam to the second UE beam. In some embodiments, a slot in which the UE sends the indication to the base station may be referred to as slot n. In some embodiments, the UE may send the indication in uplink control information (UCI) that may be encoded and transmitted via a physical uplink control channel (PUCCH) or physical uplink shared channel (PUSCH). In some embodiments, the UE may transmit the indication in a similar manner to acknowledgment-non-acknowledgment (ACK-NACK) or scheduling request (SR) bits. The UE may perform the beam switch during a UE beam switch slot that is N slots after slot n (i.e., during slot n+N, in which N represents a slot offset). Said another way, the UE may perform the beam switch on a slot index that has N slots offset relative to the slot where UE beam switch indication is transmitted. In this manner, the UE beam switching slot may be synchronized between the base station and the UE, as further described below. In some embodiments, the slot offset N may be a value defined in a technical specification. In some embodiments, the slot offset N may be configured in a memory of the base station and the UE. In some embodiments, the UE beam switch slot may be any type of slot, such as a downlink slot, and uplink slot, or a mixed slot. In some embodiments, the performance of the UE beam switch may not occupy an entire slot, and may be performed very rapidly (e.g., within tens of nanoseconds). In some embodiments, the base station may "assume" (e.g., via the performance of an operation) that the UE will perform the beam switch just before a first OFDM (orthogonal frequency division multiplexing) symbol of the UE beam switch slot used for a downlink and/or uplink signal reception or transmission by the UE. In some embodiments, the base station may determine the performance of the UE beam switch as occurring (or having occurred) just before a first OFDM symbol for both downlink and for uplink signaling.

In various embodiments, the base station may receive the proactive UE beam switch notification, and may perform a link transient mitigation operation (or one or more link transient mitigation operations). In some embodiments, starting in the UE beam switch slot (e.g., slot n+N), the base station may decrease a modulation and coding scheme (MCS) for data communications in the uplink and/or downlink (i.e., in the PDSCH and/or the PUSCH) with the UE in order to make it more robust to changed channel conditions and misaligned transmission parameters. In some embodiments, this may include a proactive outer link adaptation (OLA) loop response. In some embodiments, the base station may transmit to the UE (before or during the UE beam switch slot) control information allocating CSI-RS resources on the UE beam switch slot for a channel state information feedback (CSF) evaluation for a channel associated with the second UE beam. In some embodiments, the control information may indicate a CSF evaluation transmission time and CSF report configuration.

In some embodiments, the base station may use the decreased MCS for data communications from the UE beam switch slot until the base station receives new CSF (e.g., an updated evaluation or report of CSI) associated with the second UE beam. In some embodiments, the base station may use the decreased MCS for data communications from the UE beam switch slot until the base station receives a next SRS from the UE. In some embodiments, starting in the UE beam switch slot (e.g., slot n+N), the base station may configure a higher MCS margin for communications to and/or from the UE, to reduce the likelihood of communication link failure or beam failure. In some embodiments, starting from the UE beam switch slot, and until the next CSF report and/or SRS, the base station may utilize single layer transmissions for communications to the UE, in order to reduce a sensitivity to a potential RI and/or PMI mismatch. In some embodiments, the base station may perform the transient mitigation operation until obtaining the next CSF report from the UE.

In some embodiments, the base station may schedule (i.e., may send scheduling information to the UE) for the UE an aperiodic (AP) channel state indicator (CSI) report (i.e., CSF) with AP CSI-RS resources allocated during the UE beam switch slot or during a next available downlink slot. The base station may transmit the CSI-RS on the UE beam switch slot that will be received on UE side with the UE second beam (i.e. the new beam), and the UE may send to the base station the updated CSF based on the CSI-RS. The base station may then adjust communication parameters (e.g., MCS, PMI, and/or RI) for the channel associated with the second UE beam based on the CSF. Providing the CSI-RS and CSF scheduling this manner may reduce the potential link transient to a relatively small number of slots (also referred to as a CSF turnaround time). In some embodiments, the base station may avoid scheduling transmissions (e.g., data transmissions) to the UE until the data transmission parameters are adjusted based on the received CSF.

In some embodiments, the base station may schedule for the UE (i.e., may send scheduling information to the UE for) an aperiodic SRS during the UE beam switch slot or during a next available uplink slot. The UE may transmit the aperiodic SRS to the base station according to the scheduling information. In some embodiments, the base station may process the aperiodic SRS and may determine updated uplink data channel (e.g., PUSCH) transmission parameters for the UE aligned with the new UE beam (or the new associated composite/serving uplink (UL) beam). Scheduling the aperiodic SRS and determining the updated uplink data channel parameters in this manner may reduce the potential link transient to a relatively small number of slots (also referred to as an SRS turnaround time). In some embodiments, the base station may avoid scheduling uplink data transmissions from the UE until after adjusting the parameters for the uplink data transmissions from the UE over the new channel associated with the second UE beam in uplink.

In some embodiments, the base station may schedule (i.e., may send scheduling information for) an aperiodic tracking reference signal (TRS) during the UE beam switch slot or during a next-available downlink slot. The base station may transmit the aperiodic TRS according to the scheduling information. The UE may receive and process the aperiodic TRS, and based on the aperiodic TRS the UE may refine an estimation of channel characteristics of a channel associated with the second UE beam. In some embodiments, the base station may perform P2 beam management operations on a downlink slot after the UE beam switch slot, to perform beam refinement for the new serving beam obtained with the second UE beam following the beam switch by the UE.

FIG. 1 is a system block diagram illustrating an example communications system 100. The communications system 100 may be a 5G New Radio (NR) network, or any other suitable network such as a Long Term Evolution (LTE) network. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of UEs (illustrated as UEs 120a-120e in FIG. 1). The communications system 100 also may include a number of base stations (illustrated as the BS 110a, the BS 110b, the BS 110c, and the BS 110d) and other network entities. A base station is an entity that communicates with UEs, and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. The core network 140 may be any type core network, such as an LTE core network (e.g., an EPC network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The UE 120a-120e may communicate with the base station 110a-110d over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110d). A relay station is an entity that can receive a transmission of data from an upstream station (for example, a base station or a UE) and send a transmission of the data to a downstream station (for example, a UE or a base station). A relay station also may be a UE that can relay transmissions for other UEs. In the example illustrated in FIG. 1, a relay station 110d may communicate with macro the base station 110a and the UE 120d in order to facilitate communication between the base station 110a and the UE 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The UEs 120a, 120b, 120c may be dispersed throughout communications system 100, and each UE may be stationary or mobile. A UE also may be referred to as an access terminal, a terminal, a mobile station, a subscriber unit, a station, user equipment (UE), etc.

A macro base station 110a may communicate with the communication network 140 over a wired or wireless communication link 126. The UEs 120a, 120b, 120c may communicate with a base station 110a-110d over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 subcarriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per UE. Multi-layer transmissions with up to 2 streams per UE may be supported.

Aggregation of multiple cells may be supported with up to eight serving cells. Alternatively, NR may support a different air interface, other than an OFDM-based air interface.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless computing platform may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. The UE 120a-120e may be included inside a housing that houses components of the UE 120a-120e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some implementations, two or more UEs (for example, illustrated as the UE 120a and the UE 120e) may communicate directly using one or more sidelink channels (for example, without using a base station 110a-d as an intermediary to communicate with one another). For example, the UEs 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120a-120e may perform scheduling operations, resource selection operations, as well as other operations described elsewhere herein as being performed by the base station 110a-110d.

Figure 2A:
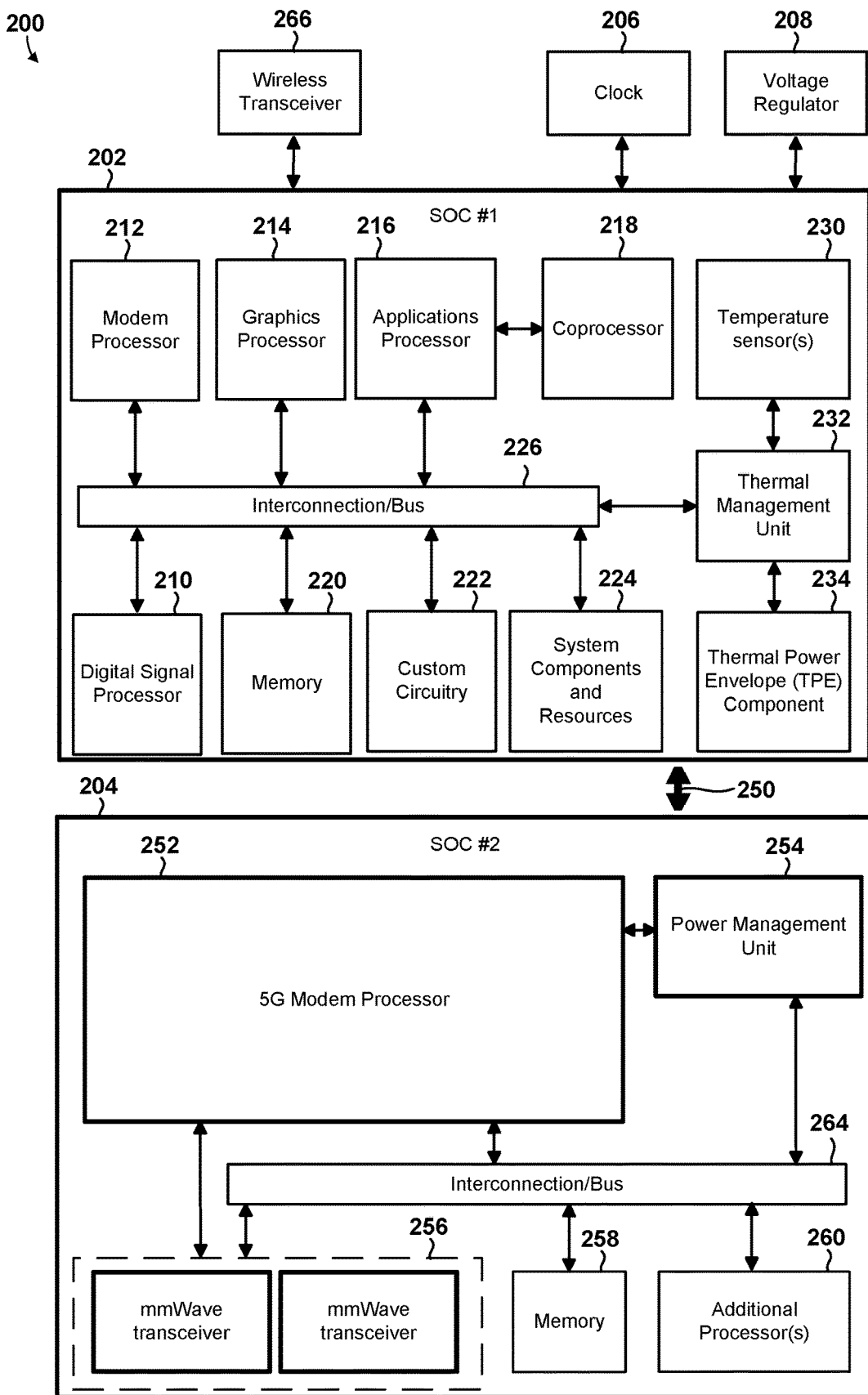
FIG. 2A is a component block diagram illustrating an example computing and wireless modem system suitable for implementing any of the various embodiments.

FIG. 2A is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2A, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from UEs, such as a base station 110a. In some implementations, the first SOC 202 may operate as central processing unit (CPU) of the UE that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wave length (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a UE. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 2B:
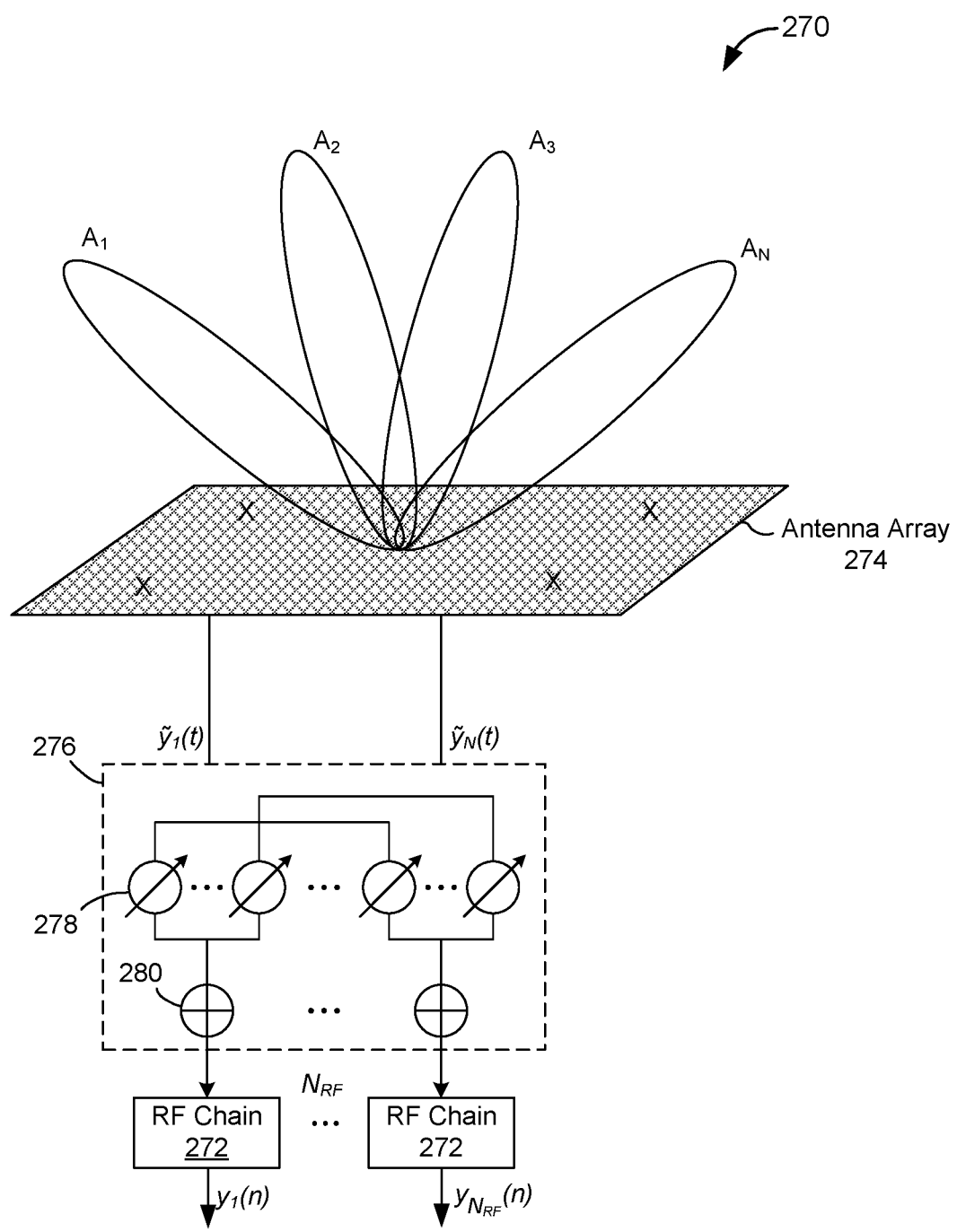
FIG. 2B is a component block diagram illustrating a mmWave receiver suitable for implementing any of the various embodiments.
Figure 2C:
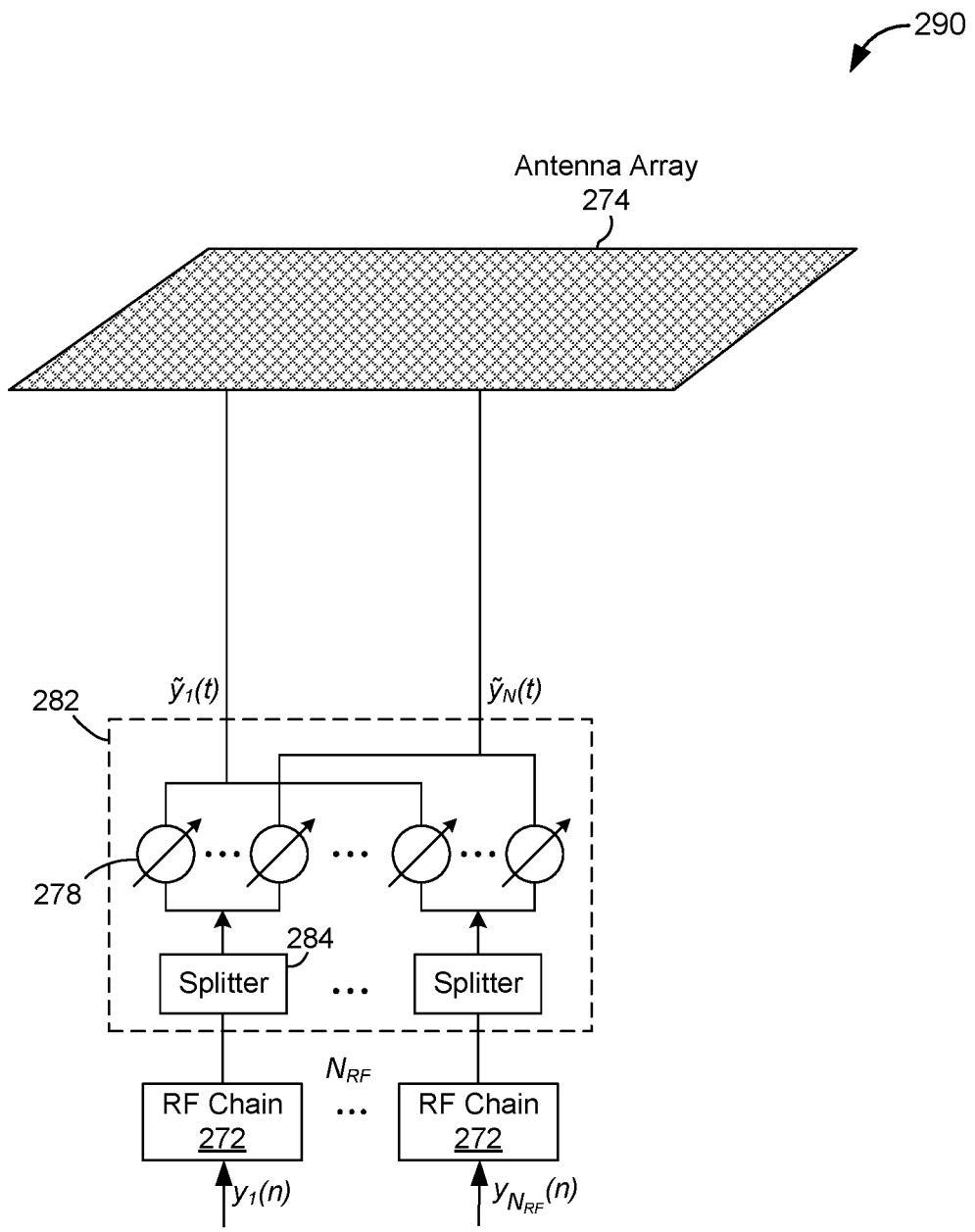
FIG. 2C is a component block diagram illustrating a mmWave transmitter suitable for implementing any of the various embodiments.

FIG. 2B is a component block diagram illustrating a mmWave receiver 270, and FIG. 2C is a component block diagram illustrating a mmWave transmitter 290, suitable for use with various aspects. The mmWave receiver 270 and the mmWave transmitter 290 may also be referred to as beamforming architectures. With reference to FIGS. 1-2C, the mmWave receiver 270 and the mmWave transmitter 290 may be used in a UE (e.g., 120a-120e, 200) or a base station (e.g., 110a-110d, 200).

In various embodiments, a UE may be configured with both the mmWave receiver 270 and the mmWave transmitter 290 (i.e., with both architectures), and may use either or both. As an example, the mmWave receiver 270 architecture and the mmWave transmitter 290 architecture may be portions of a mmWave transceiver 256. Implementing a UE with multiple architectures addresses limitations of a single static architecture. One architecture may be efficient (e.g., use an appropriate spectral efficiency, resolution, and/or power consumption and/or the like) for a first set of communications and another architecture may be efficient for a second set of communications. In contrast, static selection of a single architecture may cause inefficient utilization of computing, communication, network, and/or power resources by using the single architecture to transmit and/or receive communications.

Referring to FIG. 2B, the mmWave receiver 270 includes an antenna array 274 of a plurality of antenna elements included within one or more antenna panels. In FIG. 2B, the value "N" represents the number of antenna elements in the antenna array 274. The antenna array 274 may include a plurality of cross-polarized antennas (each symbolized by an "X"). In some implementations, the UE may be configured with four dual-pole antennas (i.e., eight in total). Based on a selected beamforming codebook, which may be translated into a set of phase shifts in an analog beamforming block, the UE may form beams $A_1$ up to $A_N$.

A mmWave receiver 270 may be configured to perform analog or hybrid beamforming. A signal $\tilde{y}_N(t)$ received at an antenna N of the antenna array 274 at a time t may propagate to a hybrid beamforming circuit 276. Hybrid beamforming may be performed in radio frequency (RF) or at an intermediate frequency (IF) through the hybrid beamforming circuit 276. The hybrid beamforming circuit 276 may include a bank of phase shifters 278 and a summer 280 connected to some of the antenna elements. While analog and hybrid beamforming techniques are generally power efficient, they are only capable of receiving in a few directions. If a mmWave signal is received outside of an analog beam supported by the mmWave receiver 270, degradation in signal quality or even beam failure may be experienced.

A mmWave receiver 270 suitable for use with various embodiments may be configured to perform analog or hybrid beamforming. The mmWave receiver 270 may perform beamforming in baseband frequencies. In the mmWave receiver 270, the number of antenna elements (e.g., 1-N) of the antenna array 274 may correspond to the number of RF chains 272 (e.g., $1-N_{RF}$). In some embodiments, the UE may be configured with high-resolution ADCs (one per RF chain).

Referring to FIG. 2C, the mmWave transmitter 290 may include the antenna array 274 of a plurality of antenna elements included within one or more antenna panels. The mmWave transmitter 290 may include a hybrid beamforming circuit 282 that may receive n signals from N RF chains 272. The hybrid beamforming circuit 282 may include a band of splitters 284 and a bank of phase shifters 278. The hybrid beamforming circuit 282 may propagate a signal $\tilde{y}_N(t)$ to an antenna N of the antenna array 274.

Figure 3:
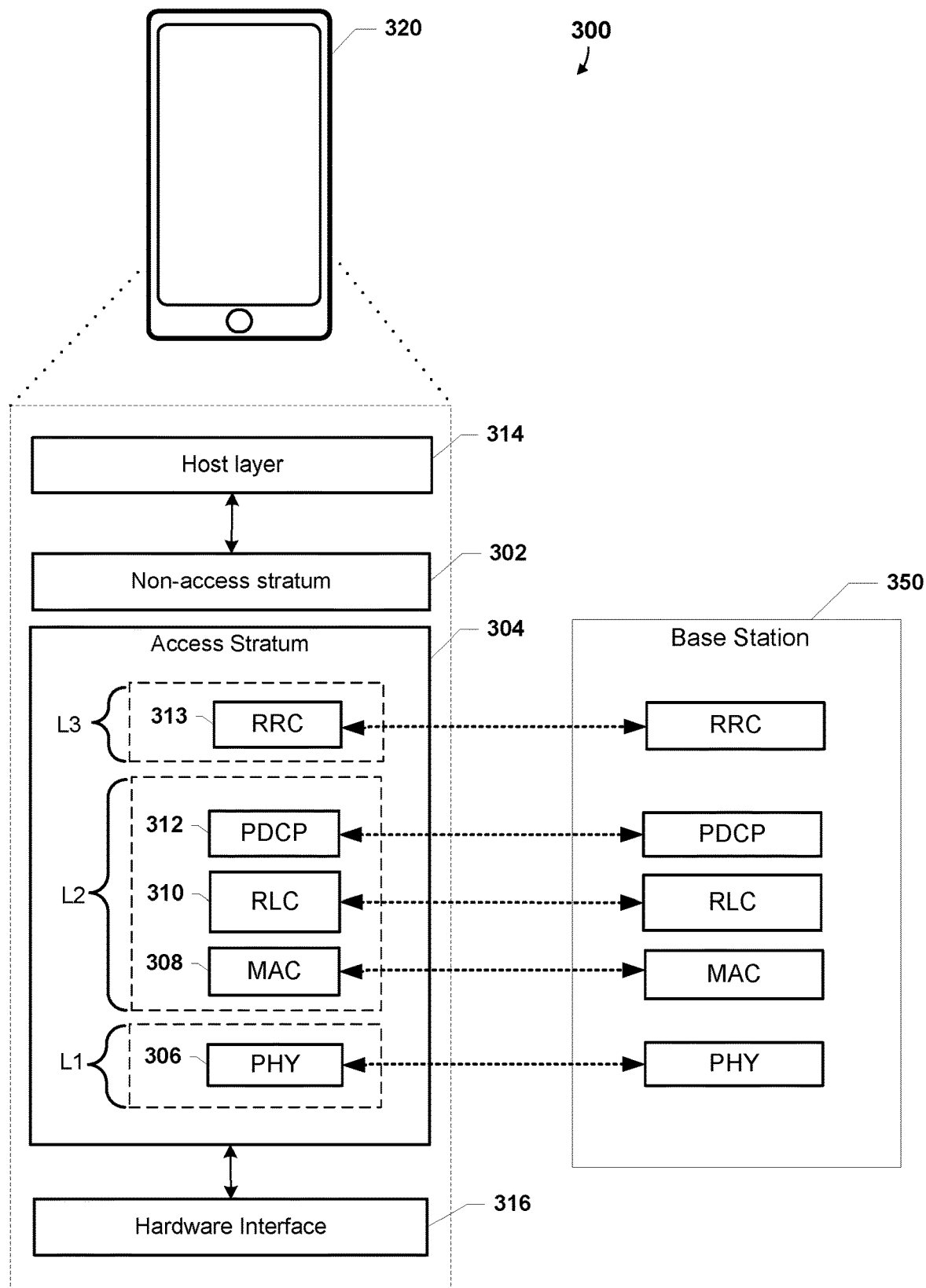
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the UE 320 may implement the software architecture 300 to facilitate communication between a UE 320 (e.g., the UE 120a-120e, 200) and the base station 350 (e.g., the base station 110a-110d) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) UE, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the UE (such as SIM(s) 204) and its core network 140. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface via a wireless transceiver (e.g., 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the UE 320 and the base station 350 over the physical layer 306. In some implementations, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some implementations, the RRC sublayer 313 may provide functions including broadcasting system information, paging, and establishing and releasing an RRC signaling connection between the UE 320 and the base station 350.

In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the UE 320. In some implementations, application-specific functions provided by the at least one host layer 314 may provide an interface between the software architecture and the general purpose processor 206.

In other implementations, the software architecture 300 may include one or more higher logical layer (such as transport, session, presentation, application, etc.) that provide host layer functions. For example, in some implementations, the software architecture 300 may include a network layer (such as Internet protocol (IP) layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

Figure 4A:
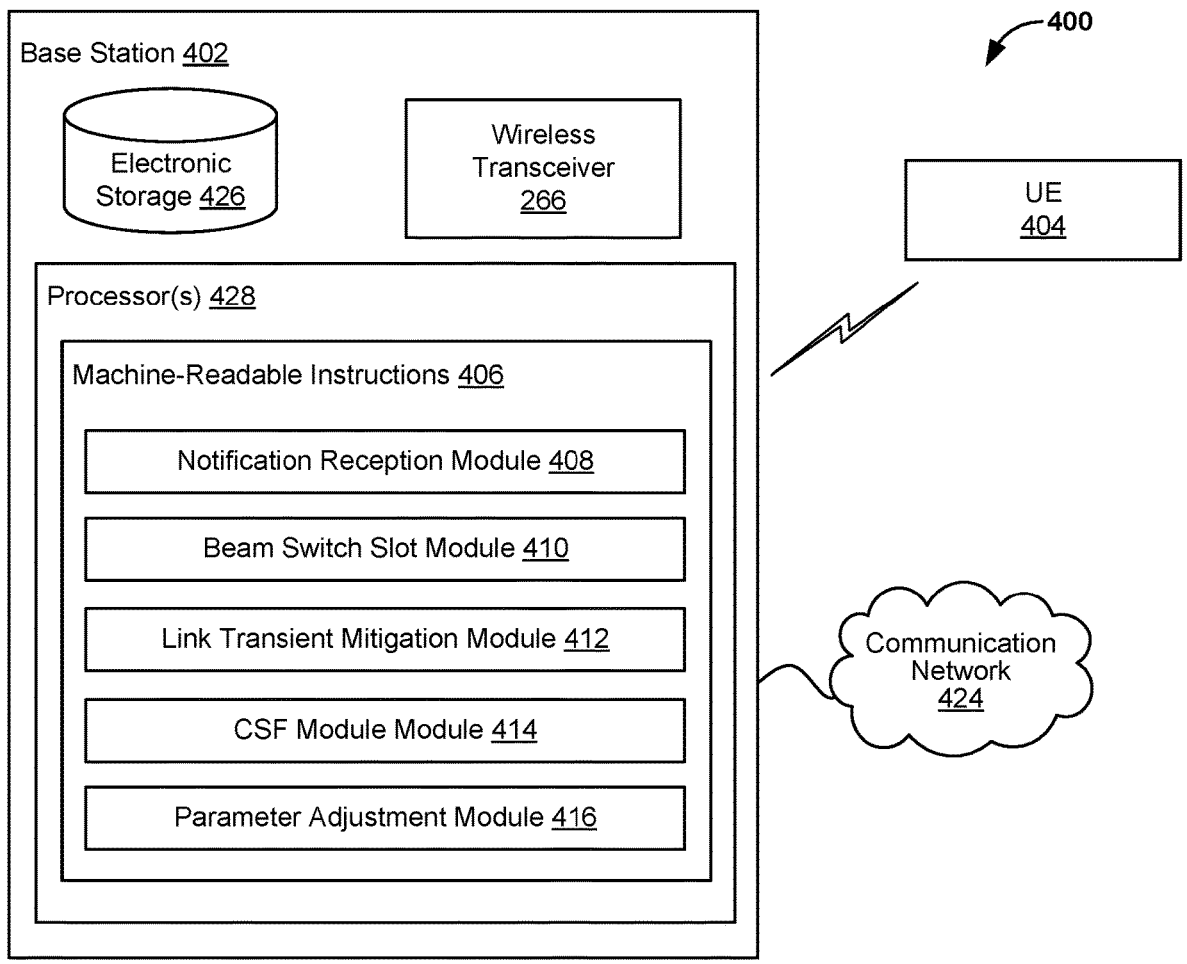
FIG. 4A is a component block diagram illustrating components and processing modules of a base station suitable for use with various embodiments.
Figure 4B:
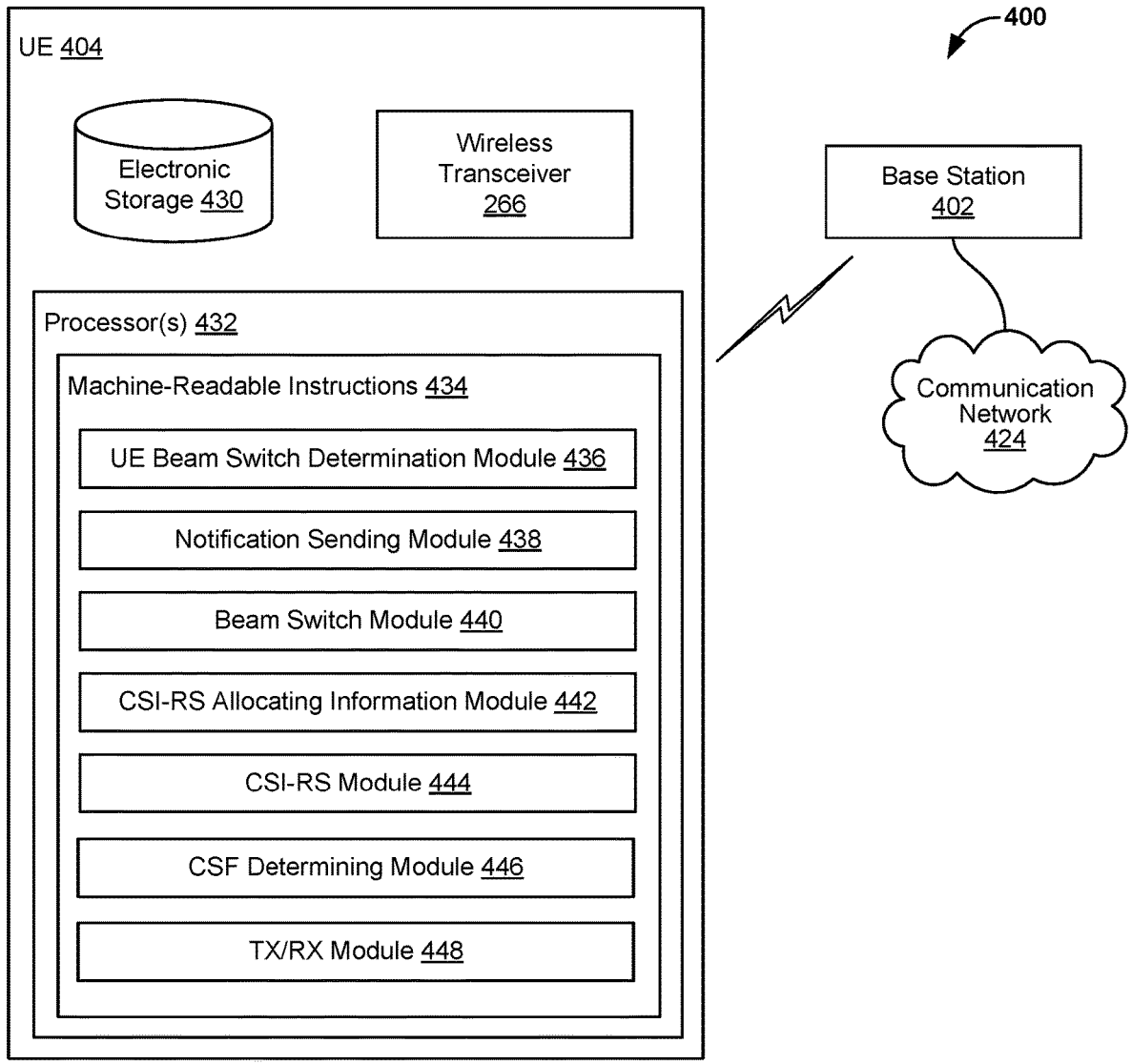
FIG. 4B is a component block diagram illustrating components and processing modules of a UE suitable for use with various embodiments.

FIGS. 4A and 4B are component block diagrams illustrating a system 400 configured for UE beam switching synchronization and post-UE-beam switching link transient mitigation in accordance with various embodiments. With reference to FIGS. 1-4B, system 400 may include a base station 402 and a UE 404 (e.g., 110a-110d, 120a-120e, 200, 320, 350). The base station 402 and the UE 404 exchange wireless communications in order to establish a wireless communication link 122, 124, 126.

The base station 402 and the UE 404 may include one or more processors 428, 432 coupled to electronic storage 426, 430 and a wireless transceiver (e.g., 266). In the base station 402 and the UE 404, the wireless transceiver 266 may be configured to receive messages sent in transmissions and pass such message to the processor(s) 428, 432 for processing. Similarly, the processor 428, 432 may be configured to send messages for transmission to the wireless transceiver 266 for transmission.

Referring to the base station 402, the processor(s) 428 may be configured by machine-readable instructions 406. Machine-readable instructions 406 may include one or more instruction modules. The instruction modules may include computer program modules. The instruction modules may include one or more of a notification reception module 408, a beam switch slot module 410, a link transient mitigation module 412, a CSF module 414, a parameter adjustment module 416, or other instruction modules.

The notification reception module 408 may be configured to receive from a UE via a serving beam a proactive notification that the UE will perform a beam switch from a first UE beam to a second UE beam, e.g., via the wireless transceiver 266.

The beam switch slot module 410 may be configured to determine based on the received notification a UE beam switch slot during which the UE will perform the beam switch.

The link transient mitigation module 412 may be configured to perform from the UE beam switch slot a link transient mitigation operation for communications over a serving beam with the UE.

The CSF module 414 may be configured to receive from the UE channel state information feedback (CSF) for a channel associated with the second UE beam.

The parameter adjustment module 416 may be configured to adjust data communication parameters to be aligned with the channel associated with the second UE beam based on the received CSF.

Referring to the computing device 404, the processor(s) 432 may be configured by machine-readable instructions 434. Machine-readable instructions 406 may include one or more instruction modules. The instruction modules may include computer program modules. The instruction modules may include one or more of a UE beam switch determination module 436, notification sending module 438, a beam switch module 440, a CSF scheduling module 442, a CSI-RS module 444, a CSF determining module 446, a TX/RX module 448, or other instruction modules.

The UE beam switch determination module 436 may be configured to determine that a UE beam switch is required.

The notification sending module 438 may be configured to send to the base station a notification that the UE will perform a beam switch from a first UE beam to a second UE beam, e.g., via the wireless transceiver 266.

The beam switch module 440 may be configured to perform the beam switch from the first UE beam to the second UE beam on a UE beam switch slot.

The CSI-RS allocating information module 442 may be configured to receive from the base station control information allocating CSI-RS resources on the UE beam switch slot for CSF for a channel associated with the second UE beam.

The CSI-RS module 444 may be configured to receive from the base station an aperiodic CSI-RS using the second UE beam.

The CSF determining module 446 may be configured to determine the CSF including information about the channel associated with the second UE beam based on the CSI-RS.

The TX/RX module 448 may be configured to transmit to the base station the CSF using the CSF resources.

In some embodiments, the base station 402 and the UE 404 may be operatively linked via one or more electronic communication links (e.g., wireless communication link 122, 124, 126). It will be appreciated that this is not intended to be limiting, and that the scope of this disclosure includes embodiments in which the base station 402 and the UE 404 may be operatively linked via some other communication medium.

The electronic storage 426, 430 may include non-transitory storage media that electronically stores information. The electronic storage media of electronic storage 426, 430 may include one or both of system storage that is provided integrally (i.e., substantially non-removable) with the base station 402 and the UE 404 and/or removable storage that is removably connectable to the base station 402 and the UE 404 via, for example, a port (e.g., a universal serial bus (USB) port, a firewire port, etc.) or a drive (e.g., a disk drive, etc.). Electronic storage 426, 430 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426, 430 may include one or more virtual storage resources (e.g., cloud storage, a virtual private network, and/or other virtual storage resources). Electronic storage 426, 430 may store software algorithms, information determined by processor(s) 428, 432, information received from the base station 402 and the UE 404, or other information that enables the base station 402 and the UE 404 to function as described herein.

Processor(s) 428, 432 may be configured to provide information processing capabilities in the base station 402 and the UE 404. As such, the processor(s) 428, 432 may include one or more of a digital processor, an analog processor, a digital circuit designed to process information, an analog circuit designed to process information, a state machine, and/or other mechanisms for electronically processing information. Although the processor(s) 428, 432 are illustrated as single entities, this is for illustrative purposes only. In some embodiments, the processor(s) 428, 432 may include a plurality of processing units and/or processor cores. The processing units may be physically located within the same device, or processor(s) 428, 432 may represent processing functionality of a plurality of devices operating in coordination. The processor(s) 428, 432 may be configured to execute modules 408-416 and modules 436-448 and/or other modules by software; hardware; firmware; some combination of software, hardware, and/or firmware; and/or other mechanisms for configuring processing capabilities on processor(s) 428, 432. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-416 and modules 436-448 described below is for illustrative purposes, and is not intended to be limiting, as any of modules 408-416 and modules 436-448 may provide more or less functionality than is described. For example, one or more of the modules 408-416 and modules 436-448 may be eliminated, and some or all of its functionality may be provided by other modules 408-416 and modules 436-448. As another example, the processor(s) 428, 432 may be configured to execute one or more additional modules that may perform some or all of the functionality attributed below to one of the modules 408-416 and modules 436-448.

Figure 5A:
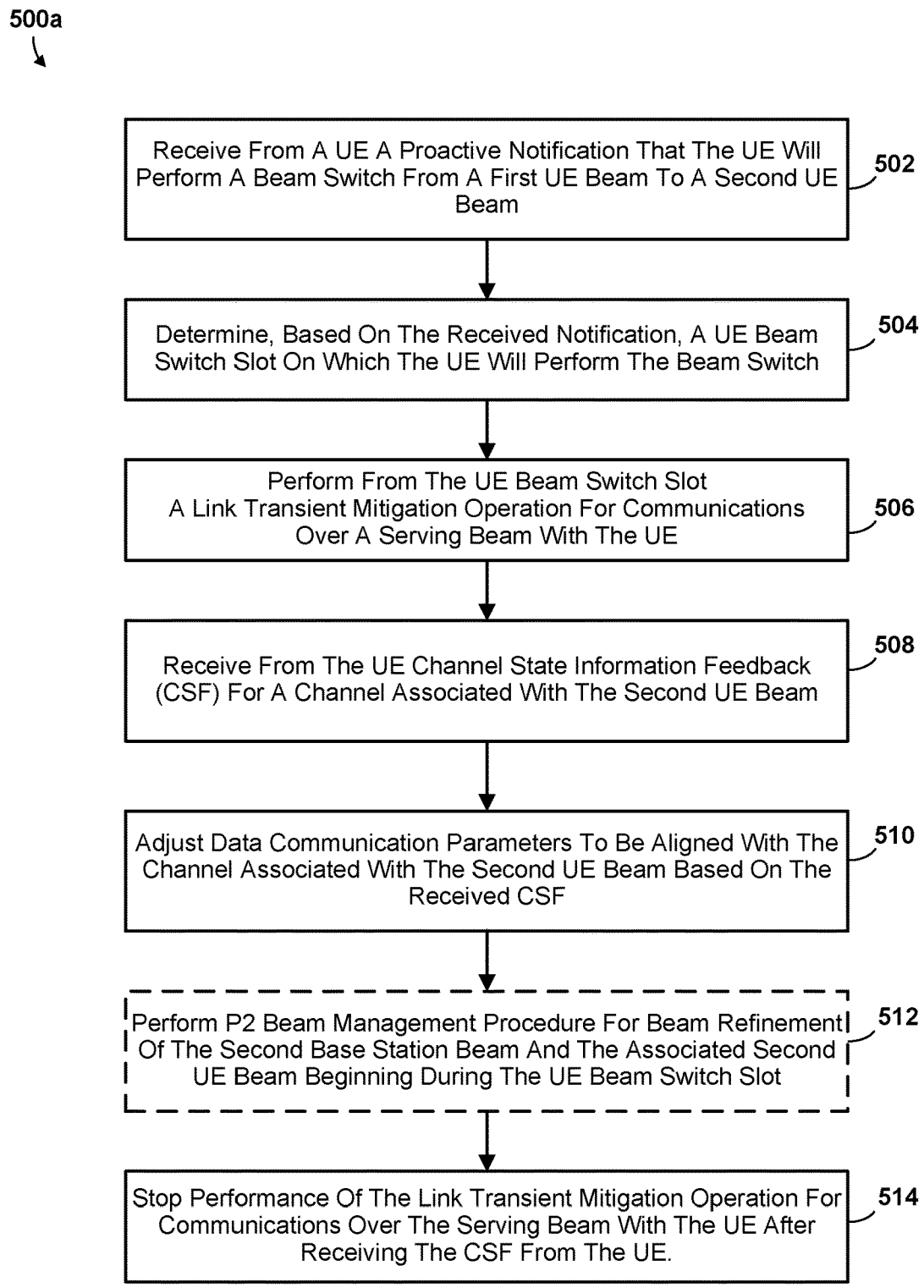
FIG. 5A is a process flow diagram illustrating a method performed by a processor of a base station for UE beam switching synchronization and post-UE-beam switching link transient mitigation according to various embodiments.

FIG. 5A is a process flow diagram illustrating a method 500a performed by a processor of a base station for UE beam switching synchronization and post-UE-beam switching link transient mitigation synchronization according to various embodiments. With reference to FIGS. 1-5A, the operations of the method 500a may be performed by a processor (such as the processor 210, 212, 214, 216, 218, 252, 260, 428) of a base station (such as the base station 110a-110d, 200, 350, 402).

In block 502, the processor may receive from a UE (e.g., via a serving beam) a proactive notification that the UE will perform a beam switch from a first UE beam to a second UE beam. Means for performing functions of the operations in block 502 may include the processor (e.g., 210, 212, 214, 216, 218, 252, 260, 428) and the wireless transceiver (e.g., 266).

In block 504, the processor may determine, based on the received notification, a UE beam switch slot on which the UE will perform the beam switch. In some embodiments, the processor may determine the UE beam switch slot based on a slot in which the base station receives the proactive notification that the UE will perform a beam switch and a slot offset. In some embodiments, the processor may determine that the UE beam switch slot may be a predetermined number of slots away from a slot in which the processor received the notification that the UE will perform the beam switch. In some embodiments, the processor may determine that the UE will perform the beam switch at the beginning of the beam switch slot. In some embodiments, the processor may determine that the UE will perform the beam switch at the beginning of a first slot relevant to a downlink symbol or an uplink symbol for the slot. Means for performing functions of the operations in block 504 may include the processor (e.g., 210, 212, 214, 216, 218, 252, 260, 428).

In block 506, the processor may perform from the UE beam switch slot a link transient mitigation operation for communications over a serving beam with the UE. In various embodiments, performing the link transient mitigation operation from the UE beam switch slot may enable the processor to perform the link transient mitigation after the UE performs the UE beam switch to the second UE beam. In some embodiments, the processor may decrease a modulation and coding scheme (MCS) for communications with the UE after it switches its beam to the second UE beam and until updated CSI information is available for the channel associated with the new UE beam. In some embodiments, the processor may increase an MCS margin for communications with the UE after it switches its beam to the second UE beam and until an updated CSI becomes available. In some embodiments, the processor may use single layer transmissions for communications with the UE during the transient period. In some embodiments, the processor may perform the link transient mitigation operation for communications with the UE after it switches to the second UE beam until the data transmission parameters are adjusted based on the received CSF. Means for performing functions of the operations in block 506 may include the processor (e.g., 210, 212, 214, 216, 218, 252, 260, 428) and the wireless transceiver (e.g., 266).

In block 508, the processor may receive from the UE channel state information feedback (CSF) for a channel associated with the second UE beam. Means for performing functions of the operations in block 508 may include the processor (e.g., 210, 212, 214, 216, 218, 252, 260, 428) and the wireless transceiver (e.g., 266).

In block 510, the processor may adjust data communication parameters to be aligned with the channel associated with the second UE beam based on the received CSF. Means for performing functions of the operations in block 510 may include the processor (e.g., 210, 212, 214, 216, 218, 252, 260, 428) and the wireless transceiver (e.g., 266).

In optional block 512, the processor may perform a P2 beam management procedure for beam refinement of the new obtained composite/serving beam after UE beam switch to the second UE beam beginning during the UE beam switch slot. In various embodiments, the UE beam switch slot may be an uplink or downlink slot. In some embodiments, resources for the CSI-RS, TRS and/or P2 may be scheduled in a first downlink slot available after the UE beam switch. In some embodiments, resources for the SRS may be scheduled in a first uplink slot available after the UE beam switch. In various embodiments, the processor may be configured to perform certain operations very quickly, such as updating the CSF (which requires scheduling CSI-RI resources), updating channel characteristics (which requires scheduling TRS resources), refining a serving beam (which requires scheduling P2 resources), and/or updating the uplink CSI (which requires uplink SRS transmission). To quickly perform such operations, the processor may schedule required downlink resources on the first available downlink slot after the UE performs the beam switch. Further, the processor may schedule required uplink resources on the first available uplink slot after the UE performs the beam switch. In some embodiments, one or more of these operations may be scheduled in a later-available downlink or uplink slot that is relatively close in time to the UE beam switch slot.

Means for performing functions of the operations in optional block 512 may include the processor (e.g., 210, 212, 214, 216, 218, 252, 260, 428) and the wireless transceiver (e.g., 266).

In block 514, the processor may stop performance of the link transient mitigation operation for communications with the UE after receiving the CSF from the UE. In some embodiments, the CSF from the UE may represent a new channel obtained by the UE after the UE beam switch, such as the channel associated with the second UE beam. Means for performing functions of the operations in block 514 may include the processor (e.g., 210, 212, 214, 216, 218, 252, 260, 428

Figure 5B:
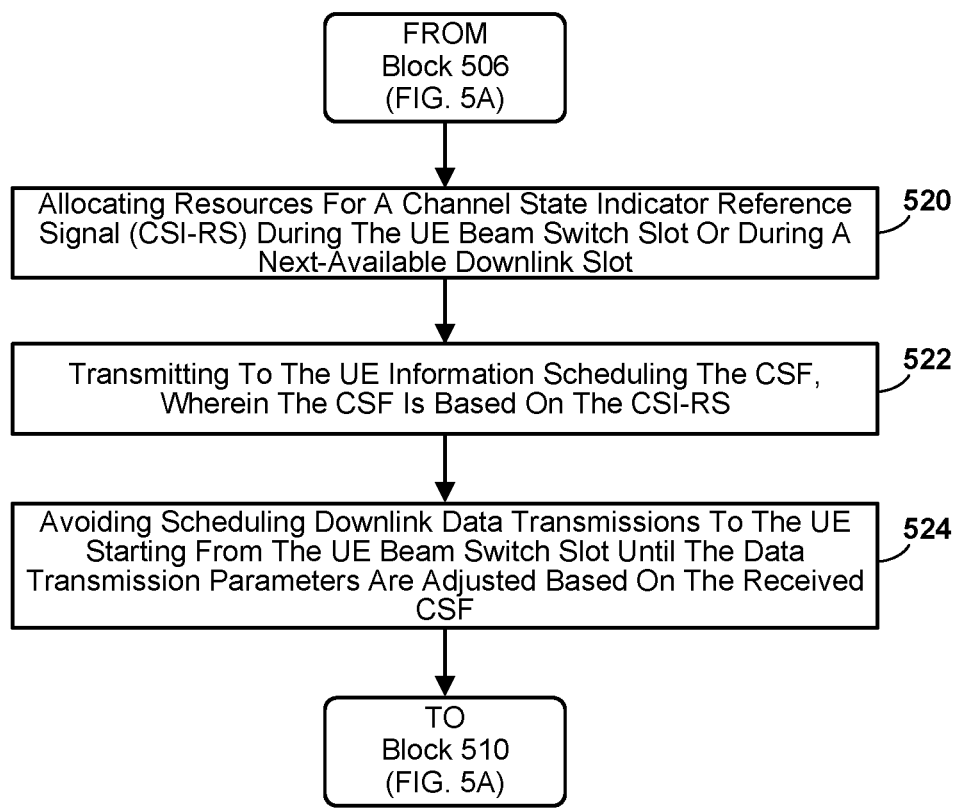
FIGS. 5B, 5C, and 5D are process flow diagrams illustrating operations that may be performed as part of the method for UE beam switching synchronization and post-UE-beam switching link transient mitigation according to various embodiments.
Figure 5C:
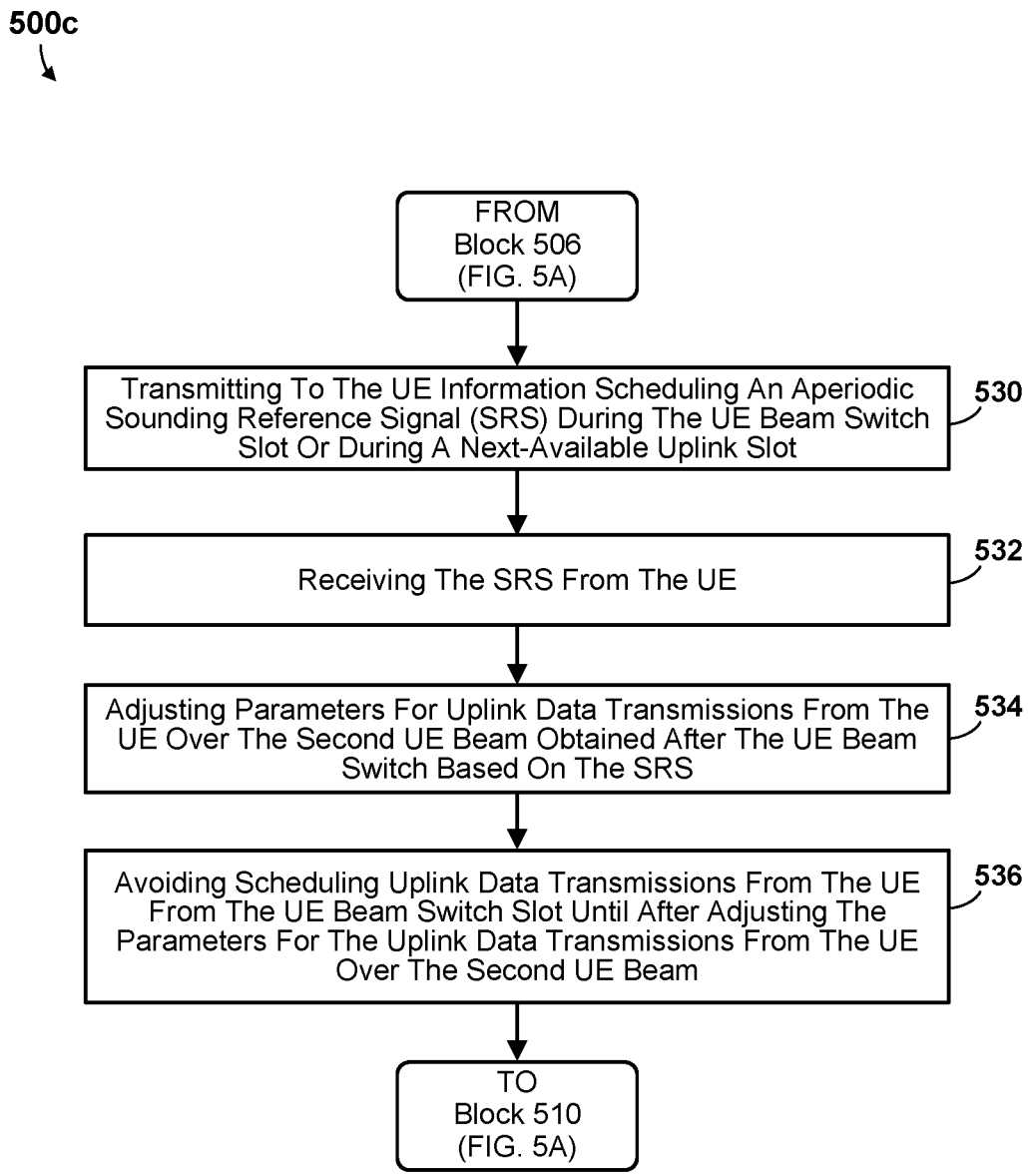
Figure 5D:
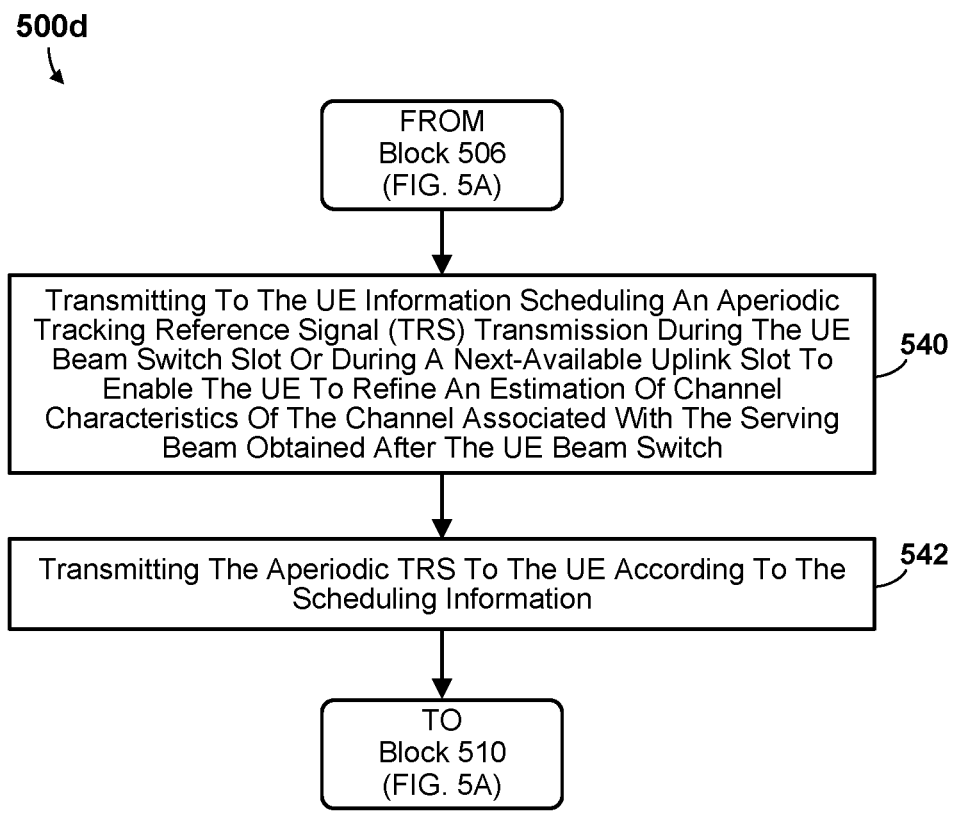

FIGS. 5B, 5C, and 5D illustrate operations 500b, 500c, and 500d that may be performed as part of the method 500a for UE beam switching synchronization and post-UE-beam switching link transient mitigation according to various embodiments. With reference to FIGS. 1-5D, the operations 500c and 500d may be performed by a processor (such as the processor 210, 212, 214, 216, 218, 252, 260, 428) of a base station (such as the base station 110a-110d, 200, 350, 402).

Referring to FIG. 5B, following the performance of the operations of block 506 (FIG. 5A), the processor may allocate resources for a CSI-reference signal (RS) during the UE beam switch slot or during a next-available downlink slot in block 520. Means for performing functions of the operations in block 520 may include the processor (e.g., 210, 212, 214, 216, 218, 252, 260, 428).

In block 522, the processor may transmit to the UE information scheduling the CSF, wherein the CSF is based on the CSI-RS. Means for performing functions of the operations in block 522 may include the processor (e.g., 210, 212, 214, 216, 218, 252, 260, 428) and the wireless transceiver (e.g., 266).

In block 524, the processor may avoid scheduling downlink data transmissions to the UE starting from the UE beam switch slot until the data transmission parameters are adjusted based on the received CSF. Means for performing functions of the operations in block 524 may include the processor (e.g., 210, 212, 214, 216, 218, 252, 260, 428) and the wireless transceiver (e.g., 266).

The processor may then proceed to perform the operations of block 510 (FIG. 5A) as described.

Referring to FIG. 5C, following the performance of the operations of block 506 (FIG. 5A), the processor may transmit to the UE information scheduling an aperiodic sounding reference signal (SRS) during the UE beam switch slot or during a next-available uplink slot in block 530. Means for performing functions of the operations in block 530 may include the processor (e.g., 210, 212, 214, 216, 218, 252, 260, 428) and the wireless transceiver (e.g., 266).

In block 532, the processor may receive from the UE the SRS. Means for performing functions of the operations in block 532 may include the processor (e.g., 210, 212, 214, 216, 218, 252, 260, 428) and the wireless transceiver (e.g., 266).

In block 534, the processor may adjust parameters for uplink data transmissions from the UE over the second UE beam obtained after the UE beam switch based on the SRS. Means for performing functions of the operations in block 530 may include the processor (e.g., 210, 212, 214, 216, 218, 252, 260, 428).

In block 536, the processor may avoid scheduling uplink data transmissions from the UE from the UE beam switch slot until after adjusting the parameters for the uplink data transmissions from the UE over the second UE beam. Means for performing functions of the operations in block 536 may include the processor (e.g., 210, 212, 214, 216, 218, 252, 260, 428).

The processor may then proceed to perform the operations of block 510 (FIG. 5A) as described.

Referring to FIG. 5D, following the performance of the operations of block 506 (FIG. 5A), the processor may transmit to the UE information scheduling an aperiodic tracking reference signal (TRS) transmission during the UE beam switch slot or during a next-available downlink slot to enable the UE to refine an estimation of channel characteristics of the channel associated with the serving beam obtained after the UE beam switch in block 540. Means for performing functions of the operations in block 540 may include the processor (e.g., 210, 212, 214, 216, 218, 252, 260, 428) and the wireless transceiver (e.g., 266).

In block 542, the processor may transmit to the UE the aperiodic TRS according to the scheduling information. Means for performing functions of the operations in block 540 may include the processor (e.g., 210, 212, 214, 216, 218, 252, 260, 428) and the wireless transceiver (e.g., 266).

The processor they may perform the operations of block 510 (FIG. 5A) as described.

Figure 6A:
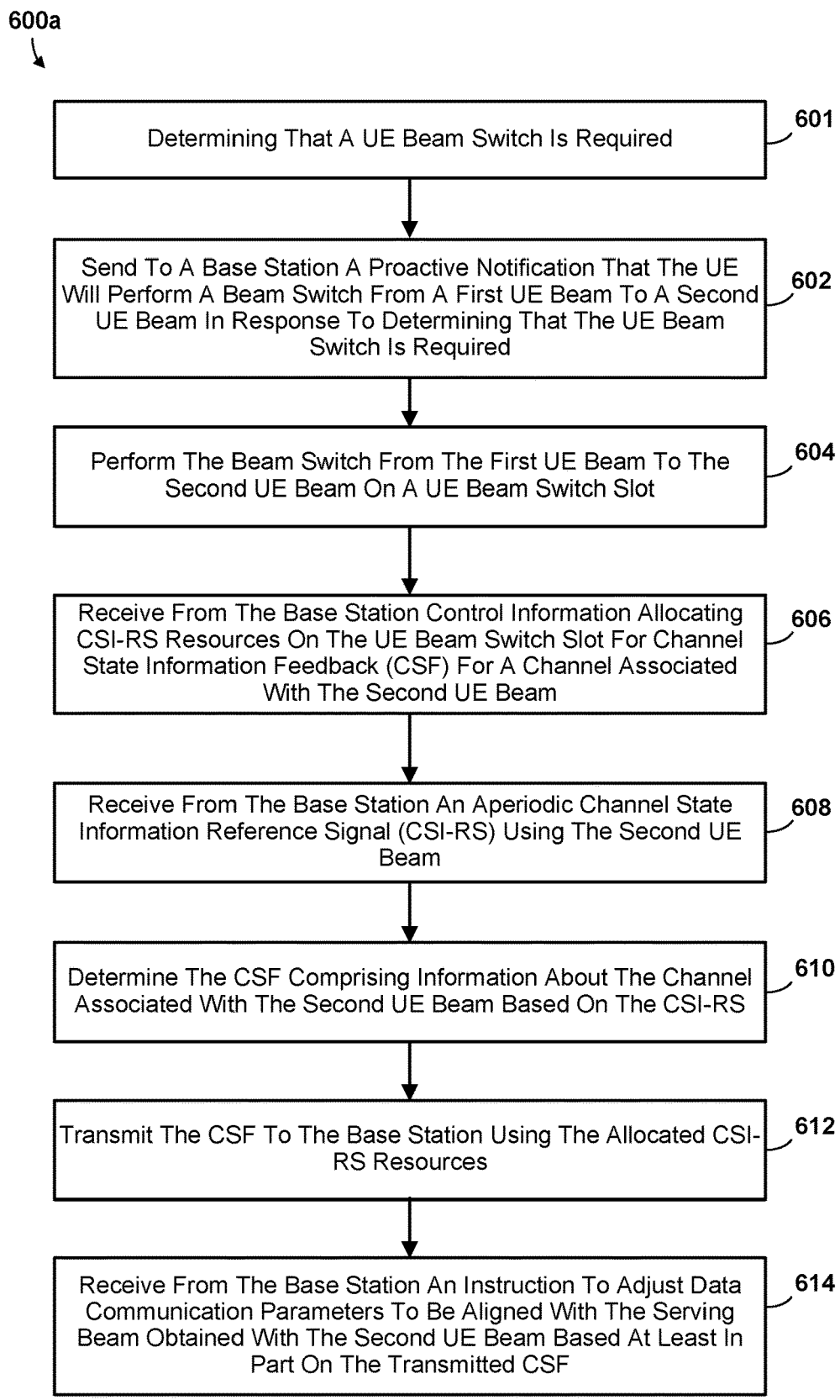
FIG. 6A is a process flow diagram illustrating a method performed by a processor of a UE for UE beam switching synchronization and post-UE-beam switching link transient mitigation according to various embodiments.

FIG. 6A is a process flow diagram illustrating a method 600a performed by a processor of a UE for UE beam switching synchronization and post-UE-beam switching link transient mitigation according to various embodiments. With reference to FIGS. 1-6A, the operations of the method 600a may be performed by a processor (such as the processor 210, 212, 214, 216, 218, 252, 260, 432) of a base station (such as the UE 120a-120f, 200, 320, 404).

In block 601, the processor may determine that a UE beam switch is required. Means for performing functions of the operations in block 601 may include the processor (e.g., 210, 212, 214, 216, 218, 252, 260, 432) and the wireless transceiver (e.g., 266).

In block 602, the UE may send to a base station a proactive notification that the UE will perform a beam switch from a first UE beam to a second UE beam in response to determining that a UE beam switch is required.

Means for performing functions of the operations in block 602 may include the processor (e.g., 210, 212, 214, 216, 218, 252, 260, 432) and the wireless transceiver (e.g., 266).

In block 604, the processor may perform the beam switch from the first UE beam to the second UE beam on a UE beam switch slot. In some embodiments, starting from the UE beam switch slot, the UE may receive using the new UE beam any downlink transmission intended for the UE and having a transmission configuration indicator (TCI) or quasi co-location (QCL) corresponding to the serving beam. Means for performing functions of the operations in block 604 may include the processor (e.g., 210, 212, 214, 216, 218, 252, 260, 432) and the wireless transceiver (e.g., 266).

In block 606, the processor may receive from the base station control information allocating CSI-RS resources on the UE beam switch slot for channel state information feedback (CSF) for a channel associated with the second UE beam. In some embodiments, the processor may receive the information allocating the CSI-RS resources on a first relevant slot, or on a later slot. In some embodiments, the information allocating the CSI-RS resources may indicate a CSF configuration and a CSF transmission time. In some embodiments, the processor may receive the information allocating the CSI-Rs resources on a first-available slot after the UE beam switch slow. In some embodiments, the processor may receive the information allocating the CSI-Rs resources on a later-available downlink or uplink slot that is relatively close in time to the UE beam switch slot. Means for performing functions of the operations in block 606 may include the processor (e.g., 210, 212, 214, 216, 218, 252, 260, 432) and the wireless transceiver (e.g., 266).

In block 608, the processor may receive from the base station an aperiodic channel state information reference signal (CSI-RS) using the second UE beam. Means for performing functions of the operations in block 608 may include the processor (e.g., 210, 212, 214, 216, 218, 252, 260, 432) and the wireless transceiver (e.g., 266).

In block 610, the processor may determine the CSF including information about a channel associated with the second UE beam based on the CSI-RS. Means for performing functions of the operations in block 610 may include the processor (e.g., 210, 212, 214, 216, 218, 252, 260, 432).

In block 612, the processor may transmit the CSF to the base station using the allocated CSI-RS resources. In some embodiments, the processor may transmit the CSF using the CSF configuration at the CSF transmission time. Means for performing functions of the operations in block 612 may include the processor (e.g., 210, 212, 214, 216, 218, 252, 260, 432) and the wireless transceiver (e.g., 266).

In block 614, the processor may receive from the base station an instruction to adjust data communication parameters to be aligned with the serving beam obtained with the second UE beam based on the transmitted CSF. Means for performing functions of the operations in block 614 may include the processor (e.g., 210, 212, 214, 216, 218, 252, 260, 432) and the wireless transceiver (e.g., 266).

Figure 6B:
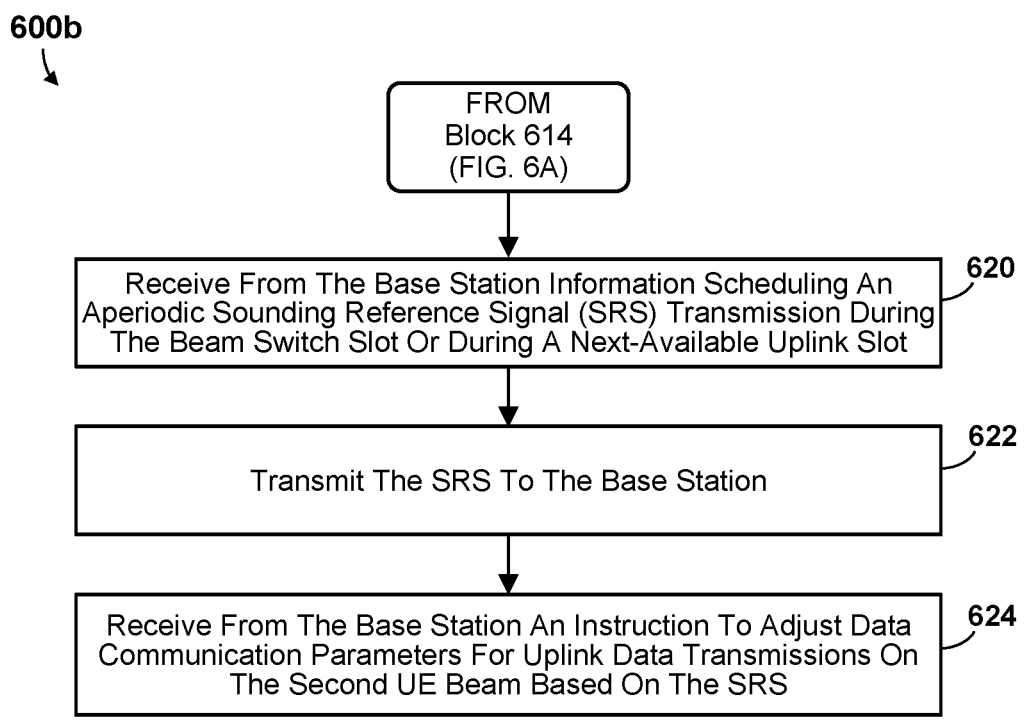
FIGS. 6B and 6C illustrate operations that may be performed as part of the method for UE beam switching synchronization and post-UE-beam switching link transient mitigation according to various embodiments.
Figure 6C:
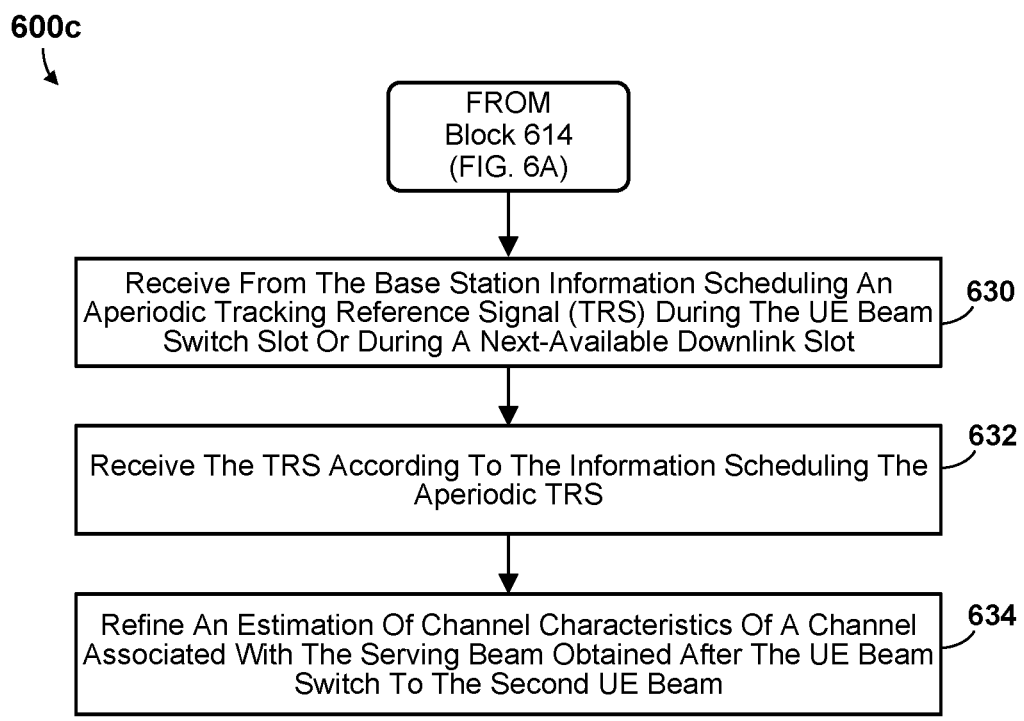

FIGS. 6B and 6C illustrate operations 600b and 600c that may be performed by a processor of UE as part of the method 600a for UE beam switching synchronization according and post-UE-beam switching link transient mitigation to various embodiments. With reference to FIGS. 1-6C, the operations 600b and 600c may be performed by a processor (such as the processor 210, 212, 214, 216, 218, 252, 260, 432) of a UE (such as the UE 120a-120f, 200, 320, 404).

Referring to FIG. 6B, following the performance of the operations of block 614 (FIG. 6A), the processor may receive from the base station information scheduling an aperiodic sounding reference signal (SRS) transmission during the UE beam switch slot or during a next-available uplink slot in blocks 620. Means for performing functions of the operations in block 620 may include the processor (e.g., 210, 212, 214, 216, 218, 252, 260, 432).

In block 622, the processor may transmit the SRS to the base station. Means for performing functions of the operations in block 622 may include the processor (e.g., 210, 212, 214, 216, 218, 252, 260, 432) and the wireless transceiver (e.g., 266).

In block 624, the processor may receive from the base station an instruction to adjust data communication parameters for uplink data transmissions on the second UE beam based on the SRS. Means for performing functions of the operations in block 624 may include the processor (e.g., 210, 212, 214, 216, 218, 252, 260, 432) and the wireless transceiver (e.g., 266).

Referring to FIG. 6C, following the performance of the operations of block 614 (FIG. 6A), the processor may receive from the base station information scheduling an aperiodic tracking reference signal (TRS) during the UE beam switch slot or during a next-available downlink slot in block 630. Means for performing functions of the operations in block 630 may include the processor (e.g., 210, 212, 214, 216, 218, 252, 260, 432) and the wireless transceiver (e.g., 266).

In block 632, the processor may receive the TRS according to the information scheduling the aperiodic TRS. Means for performing functions of the operations in block 632 may include the processor (e.g., 210, 212, 214, 216, 218, 252, 260, 432) and the wireless transceiver (e.g., 266).

In block 634, the processor may refine an estimation of channel characteristics of a channel associated with the serving beam obtained after the UE beam switch to the second UE beam. Means for performing functions of the operations in block 634 may include the processor (e.g., 210, 212, 214, 216, 218, 252, 260, 432) and the wireless transceiver (e.g., 266).

Figure 7:
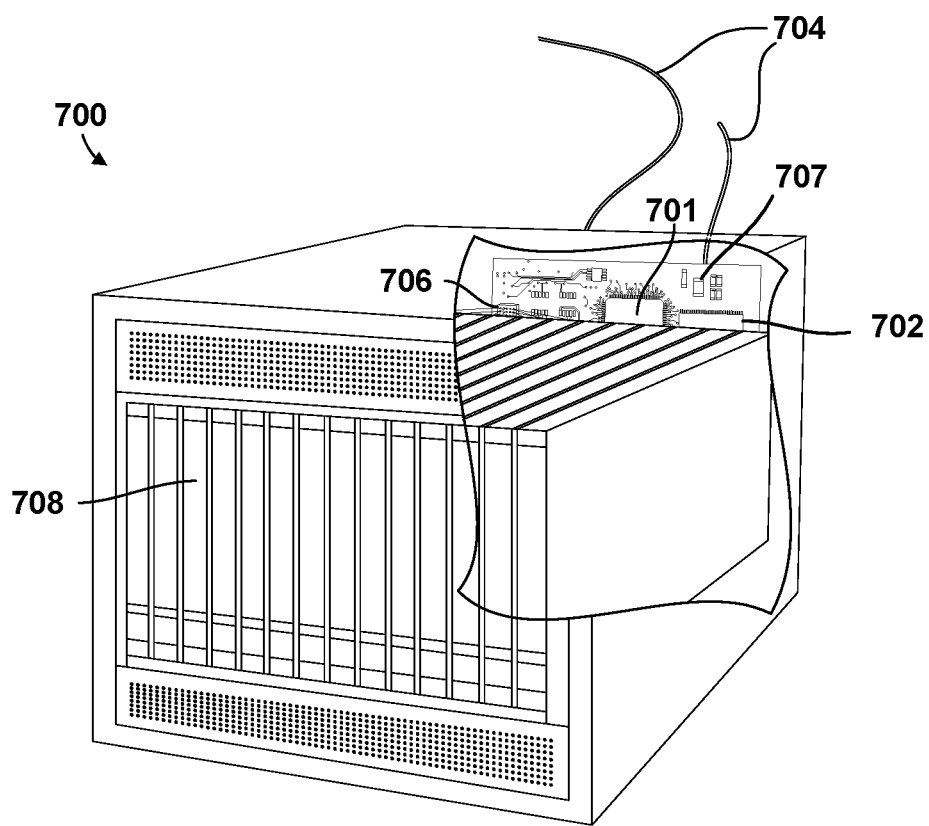
FIG. 7 is a component block diagram of a base station computing device suitable for use with various embodiments.

FIG. 7 is a component block diagram of a base station computing device suitable for use with various embodiments. Such base station computing devices (e.g., base station 110a-110d, 350, 402) may include at least the components illustrated in FIG. 7. With reference to FIGS. 1-7, the base station computing device 700 may typically include a processor 701 coupled to volatile memory 702 and a large capacity nonvolatile memory, such as a disk drive 708. The base station computing device 700 also may include a peripheral memory access device 706 such as a floppy disc drive, compact disc (CD) or digital video disc (DVD) drive coupled to the processor 701. The base station computing device 700 also may include network access ports 704 (or interfaces) coupled to the processor 701 for establishing data connections with a network, such as the Internet or a local area network coupled to other system computers and servers. The base station computing device 700 may include one or more antennas 707 for sending and receiving electromagnetic radiation that may be connected to a wireless communication link. The base station computing device 700 may include additional access ports, such as USB, Firewire, Thunderbolt, and the like for coupling to peripherals, external memory, or other devices.

Figure 8:
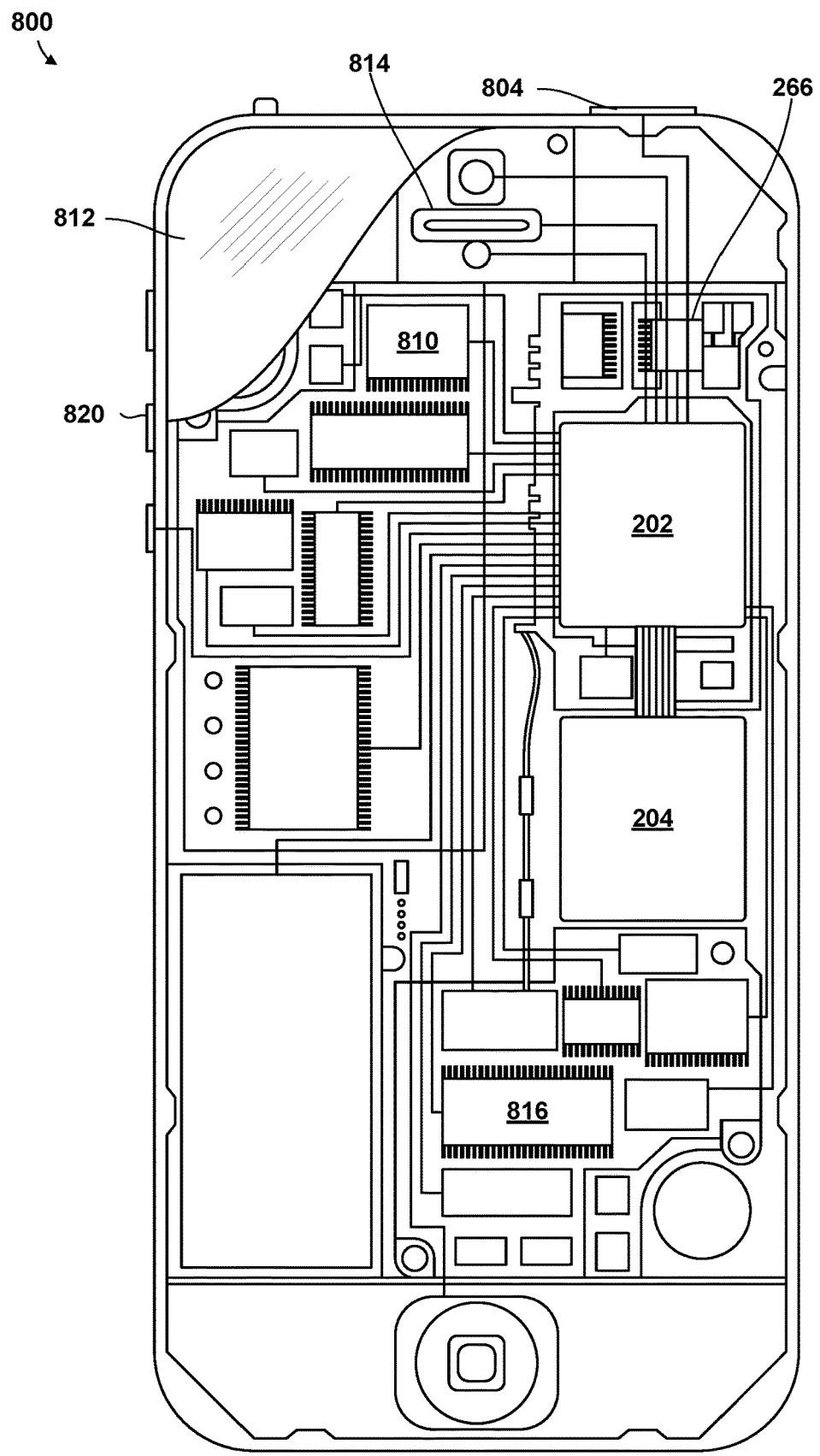
FIG. 8 is a component block diagram of a UE suitable for use with various embodiments.

FIG. 8 is a component block diagram of a UE 800 suitable for use with various embodiments. With reference to FIGS. 1-8, various embodiments may be implemented on a variety of UEs 800 (for example, the UE 120a-120e, 200, 320, 404), an example of which is illustrated in FIG. 8 in the form of a smartphone. The UE 800 may include a first SOC 202 (for example, a SOC-CPU) coupled to a second SOC 204 (for example, a 5G capable SOC). The first and second SOCs 202, 204 may be coupled to internal memory 816, a display 812, and to a speaker 814. Additionally, the UE 800 may include an antenna 804 for sending and receiving electromagnetic radiation that may be connected to a wireless transceiver 266 coupled to one or more processors in the first and/or second SOCs 202, 204. UE 800 may include menu selection buttons or rocker switches 820 for receiving user inputs.

The UE 800 may include a sound encoding/decoding (CODEC) circuit 810, which digitizes sound received from a microphone into data packets suitable for wireless transmission and decodes received sound data packets to generate analog signals that are provided to the speaker to generate sound. One or more of the processors in the first and second SOCs 202, 204, wireless transceiver 266 and CODEC 810 may include a digital signal processor (DSP) circuit (not shown separately).

The processors of the base station computing device 700 and the UE 800 may be any programmable microprocessor, microcomputer or multiple processor chip or chips that can be configured by software instructions (applications) to perform a variety of functions, including the functions of some implementations described below. In some UEs, multiple processors may be provided, such as one processor within an SOC 204 dedicated to wireless communication functions and one processor within an SOC 202 dedicated to running other applications. Software applications may be stored in the memory 702, 816 before they are accessed and loaded into the processor. The processors may include internal memory sufficient to store the application software instructions.

Implementation examples are described in the following paragraphs. While some of the following implementation examples are described in terms of example methods, further example implementations may include: the example methods discussed in the following paragraphs implemented by a base station or a UE comprising a processor configured with processor-executable instructions to perform operations of the methods of the following implementation examples; the example methods discussed in the following paragraphs implemented by a base station or a UE comprising means for performing functions of the methods of the following implementation examples; and the example methods discussed in the following paragraphs may be implemented as a non-transitory processor-readable storage medium having stored thereon processor-executable instructions configured to cause a processor of a base station or a UE to perform the operations of the methods of the following implementation examples.

Example 1. A method performed by a processor of a base station for UE beam switching synchronization and post-UE-beam switching link transient mitigation, including. receiving from a UE a proactive notification that the UE will perform a beam switch from a first UE beam to a second UE beam; determining, based on the received notification, a UE beam switch slot on which the UE will perform the beam switch; performing from the UE beam switch slot a link transient mitigation operation for communications over a serving beam with the UE; receiving from the UE CSF for a channel associated with the second UE beam; and adjusting data communication parameters to be aligned with the channel associated with the second UE beam based on the received CSF.

Example 2. The method of example 1, further including stopping performance of the link transient mitigation operation for communications over the serving beam with the UE after receiving the CSF from the UE.

Example 3. The method of either of examples 1 or 2, wherein performing from the UE beam switch slot the link transient mitigation operation for communications over the serving beam with the UE includes decreasing an MCS for communications with the UE.

Example 4. The method of either of examples 1 or 2, wherein performing from the UE beam switch slot the link transient mitigation operation for communications over the serving beam with the UE includes increasing an MCS margin for an outer link adaptation loop for communications with the UE.

Example 5. The method of either of examples 1 or 2, wherein performing from the UE beam switch slot the link transient mitigation operation for communications over the serving beam with the UE includes using single layer transmissions for communications with the UE.

Example 6. The method of either of examples 1 or 2, wherein performing from the UE beam switch slot the link transient mitigation operation for communications over the serving beam with the UE includes performing the link transient mitigation operation for communications with the UE until the data transmission parameters are adjusted based on the received CSF or based on the received SRS associated with the channel obtained with the second UE beam.

Example 7. The method of any of examples 1-6, further including: allocating resources for a CSI-RS during the UE beam switch slot or during a next-available downlink slot; and transmitting information scheduling the CSF to the UE, wherein the CSF is based on the CSI-RS.

Example 8. The method of example 7, wherein adjusting data communication parameters to be aligned with the channel associated with the second UE beam based on the received CSF includes avoiding scheduling downlink data transmissions to the UE starting from the UE beam switch slot until the data transmission parameters are adjusted based on the received CSF.

Example 9. The method of any of examples 1-8, further including: transmitting to the UE information scheduling an aperiodic SRS transmission during the UE beam switch slot or during a next-available uplink slot; and receiving the SRS from the UE.

Example 10. The method of example 9 further including: adjusting parameters for uplink data transmissions from the UE over the second UE beam obtained after the UE beam switch based on the SRS; and avoiding scheduling uplink data transmissions from the UE from the UE beam switch slot until after adjusting the parameters for the uplink data transmissions from the UE over the second UE beam.

Example 11. The method of any of examples 1-10, further including: transmitting to the UE information scheduling an aperiodic TRS transmission during the UE beam switch slot or during a next-available downlink slot to enable the UE to refine an estimation of channel characteristics of the channel associated with the serving beam obtained after the UE beam switch; and transmitting the aperiodic TRS to the UE according to the scheduling information.

Example 12. The method of any of examples 1-11, wherein determining based on the received notification a UE beam switch slot on which the UE will perform the beam switch includes determining the UE beam switch slot based on a slot in which the base station receives the notification that the UE will perform a beam switch and a slot offset.

Example 13. The method of any of examples 1-12, further including performing a P2 beam management procedure for beam refinement of the serving base station beam after the UE beam switch to the second UE beam and beginning from the UE beam switch slot.

Example 14. A method performed by a processor of a UE for UE beam switching synchronization and post-UE-beam switching link transient mitigation, including. determining that a UE beam switch is required; sending to a base station a proactive notification that the UE will perform a beam switch from a first UE beam to a second UE beam in response to determining that a UE beam switch is required; performing the beam switch from the first UE beam to the second UE beam on a UE beam switch slot; receiving from the base station control information allocating CSI-RS resources on the UE beam switch slot for CSF for a channel associated with the second UE beam; receiving from the base station an aperiodic CSI-RS using the second UE beam; determining the CSF comprising information about the channel associated with the second UE beam based on the CSI-RS; transmitting the CSF to the base station using the allocated CSI-RS resources; and receiving from the base station an instruction to adjust data communication parameters to be aligned with the channel associated with the second UE beam based at least in part on the transmitted CSF.

Example 15. The method of example 14, further including: receiving from the base station information scheduling an aperiodic SRS transmission during the UE beam switch slot or during a next-available uplink slot; transmitting to the base station the SRS; and receiving from the base station an instruction to adjust data communication parameters for uplink data transmissions on the second UE beam based on the SRS.

Example 16. The method of either examples 14 or 15, further including: receiving from the base station information scheduling an aperiodic TRS during the UE beam switch slot or during a next-available downlink slot; receiving the TRS according to the information scheduling the aperiodic TRS; and refining an estimation of channel characteristics of a channel associated with the serving beam obtained after the UE beam switch to the second UE beam.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a UE and the UE may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G) as well as later generation 3GPP technology, GSM, universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods and operations 500a, 500b, 500c, 500d, 600a, 600b, and 600c may be substituted for or combined with one or more operations of the methods and operations 500a, 500b, 500c, 500d, 600a, 600b, and 600c.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a base station for user equipment (UE) beam switching synchronization and post-UE-beam switching link transient mitigation, comprising:

receiving from a UE in uplink control information (UCI) a proactive notification that the UE will perform a beam switch from a first UE beam to a second UE beam;
determining, based on the received proactive notification, a UE beam switch slot on which the UE will perform the beam switch;
performing from the UE beam switch slot a link transient mitigation operation for communications over a serving beam with the UE;
receiving from the UE channel state information feedback (CSF) for a channel associated with the second UE beam; and
adjusting data communication parameters to be aligned with the channel associated with the second UE beam based on the received CSF.

2. The method of claim 1, further comprising stopping performance of the link transient mitigation operation for communications over the serving beam with the UE after receiving the CSF from the UE.

3. The method of claim 1, wherein performing from the UE beam switch slot the link transient mitigation operation for communications over the serving beam with the UE comprises decreasing a modulation and coding scheme (MCS) for communications with the UE.

4. The method of claim 1, wherein performing from the UE beam switch slot the link transient mitigation operation for communications over the serving beam with the UE comprises increasing an MCS margin for an outer link adaptation loop for communications with the UE.

5. The method of claim 1, wherein performing from the UE beam switch slot the link transient mitigation operation for communications over the serving beam with the UE comprises using single layer transmissions for communications with the UE.

6. The method of claim 1, wherein performing from the UE beam switch slot the link transient mitigation operation for communications over the serving beam with the UE comprises performing the link transient mitigation operation for communications with the UE until the data transmission parameters are adjusted based on the received CSF or based on the received SRS associated with the channel obtained with the second UE beam.

7. The method of claim 1, further comprising:
allocating resources for a channel state indicator-reference signal (CSI-RS) during the UE beam switch slot or during a next-available downlink slot; and
transmitting to the UE information scheduling the CSF, wherein the CSF is based on the CSI-RS.

8. The method of claim 7, wherein adjusting data communication parameters to be aligned with the channel associated with the second UE beam based on the received CSF comprises avoiding scheduling downlink data transmissions to the UE starting from the UE beam switch slot until the data transmission parameters are adjusted based on the received CSF.

9. The method of claim 1, further comprising:
transmitting to the UE information scheduling an aperiodic sounding reference signal (SRS) transmission during the UE beam switch slot or during a next-available uplink slot; and
receiving the SRS from the UE.

10. The method of claim 9 further comprising:
adjusting parameters for uplink data transmissions from the UE over the second UE beam obtained after the UE beam switch based on the SRS; and
avoiding scheduling uplink data transmissions from the UE from the UE beam switch slot until after adjusting the parameters for the uplink data transmissions from the UE over the second UE beam.

11. The method of claim 1, further comprising:
transmitting to the UE information scheduling an aperiodic tracking reference signal (TRS) transmission during the UE beam switch slot or during a next-available downlink slot to enable the UE to refine an estimation of channel characteristics of the channel associated with the serving beam obtained after the UE beam switch; and
transmitting the aperiodic TRS to the UE according to the scheduling information.

12. The method of claim 1, wherein determining based on the received proactive notification a UE beam switch slot on which the UE will perform the beam switch comprises determining the UE beam switch slot based on a slot in which the base station receives the proactive notification that the UE will perform a beam switch and a slot offset.

13. The method of claim 1, further comprising performing a P2 beam management procedure for beam refinement of the serving base station beam after the UE beam switch to the second UE beam and beginning from the UE beam switch slot.

14. A method performed by a processor of a user equipment (UE) for UE beam switching synchronization and post-UE-beam switching link transient mitigation, comprising:
determining that a UE beam switch is required;
sending to a base station a proactive notification that the UE will perform a beam switch from a first UE beam to a second UE beam in response to determining that a UE beam switch is required;
performing the beam switch from the first UE beam to the second UE beam on a UE beam switch slot;
receiving from the base station control information allocating channel state information reference signal (CSI-RS)resources on the UE beam switch slot for channel state information feedback (CSF) for a channel associated with the second UE beam;
receiving from the base station an aperiodic CSI-RS using the second UE beam;
determining the CSF comprising information about the channel associated with the second UE beam based on the CSI-RS;
transmitting the CSF to the base station using the allocated CSI-RS resources; and
receiving from the base station an instruction to adjust data communication parameters to be aligned with the channel associated with the second UE beam based at least in part on the transmitted CSF.

15. The method of claim 14, further comprising:
receiving from the base station information scheduling an aperiodic sounding reference signal (SRS) transmission during the UE beam switch slot or during a next-available uplink slot;
transmitting the SRS to the base station; and
receiving from the base station an instruction to adjust data communication parameters for uplink data transmissions on the second UE beam based on the SRS.

16. The method of claim 14, further comprising:
receiving from the base station information scheduling an aperiodic tracking reference signal (TRS) during the UE beam switch slot or during a next-available downlink slot;
receiving the TRS according to the information scheduling the aperiodic TRS; and refining an estimation of channel characteristics of a channel associated with the serving beam obtained after the UE beam switch to the second UE beam.

17. A base station, comprising:
a processor configured with processor executable instructions to perform operations comprising:
receiving from a user equipment (UE) in uplink control information (UCI) a proactive notification that the UE will perform a beam switch from a first UE beam to a second UE beam;
determining, based on the received proactive notification, a UE beam switch slot on which the UE will perform the beam switch;
performing from the UE beam switch slot a link transient mitigation operation for communications over a serving beam with the UE;
receiving from the UE channel state information feedback (CSF) for a channel associated with the second UE beam; and
adjusting data communication parameters to be aligned with the channel associated with the second UE beam based on the received CSF.

18. The base station of claim 17, wherein the processor is configured with processor executable instructions to perform operations further comprising stopping performance of the link transient mitigation operation for communications over the serving beam with the UE after receiving the CSF from the UE.

19. The base station of claim 17, wherein the processor is configured with processor executable instructions to perform operations such that performing from the UE beam switch slot the link transient mitigation operation for communications over the serving beam with the UE comprises decreasing a modulation and coding scheme (MCS) for communications with the UE.

20. The base station of claim 17, wherein the processor is configured with processor executable instructions to perform operations such that performing from the UE beam switch slot the link transient mitigation operation for communications over the serving beam with the UE comprises increasing an MCS margin for outer link adaptation loop for communications with the UE.

21. The base station of claim 17, wherein the processor is configured with processor executable instructions to perform operations such that performing from the UE beam switch slot the link transient mitigation operation for communications over the serving beam with the UE comprises using single layer transmissions for communications with the UE.

22. The base station of claim 17, wherein the processor is configured with processor executable instructions to perform operations such that performing from the UE beam switch slot the link transient mitigation operation for communications over the serving beam with the UE comprises performing the link transient mitigation operation for communications with the UE until the data transmission parameters are adjusted based on the received CSF or based on the received SRS associated with the channel obtained with the second UE beam.

23. The base station of claim 17, wherein the processor is configured with processor executable instructions to perform operations further comprising:
allocating resources for a CSI-reference signal (RS) during the UE beam switch slot or during a next-available downlink slot; and
transmitting to the UE information scheduling the CSF, wherein the CSF is based on the CSI-RS.

24. The base station of claim 23, wherein the processor is configured with processor executable instructions to perform operations such that adjusting data communication parameters to be aligned with the channel associated with the second UE beam based on the received CSF comprises avoiding scheduling downlink data transmissions to the UE starting from the UE beam switch slot until the data transmission parameters are adjusted based on the received CSF.

25. The base station of claim 17, wherein the processor is configured with processor executable instructions to perform operations further comprising:
transmitting to the UE information scheduling an aperiodic sounding reference signal (SRS) transmission during the UE beam switch slot or during a next-available uplink slot; and
receiving the SRS from the UE.

26. The base station of claim 25, wherein the processor is configured with processor executable instructions to perform operations further comprising:
adjusting parameters for uplink data transmissions from the UE over the second UE beam obtained after the UE beam switch based on the SRS; and
avoiding scheduling uplink data transmissions from the UE from the UE beam switch slot until after adjusting the parameters for the uplink data transmissions from the UE over the second UE beam.

27. The base station of claim 17, wherein the processor is configured with processor executable instructions to perform operations further comprising:
transmitting to the UE information scheduling an aperiodic tracking reference signal (TRS) transmission during the UE beam switch slot or during a next-available downlink slot to enable the UE to refine an estimation of channel characteristics of the channel associated with the serving beam obtained after the UE beam switch; and
transmitting the aperiodic TRS to the UE according to the scheduling information.

28. The base station of claim 17, wherein the processor is configured with processor executable instructions to perform operations such that determining based on the received proactive notification a UE beam switch slot on which the UE will perform the beam switch comprises determining the UE beam switch slot based on a slot in which the base station receives the proactive notification that the UE will perform a beam switch and a slot offset.

29. The base station of claim 17, wherein the processor is configured with processor executable instructions to perform operations further comprising performing a P2 beam management procedure for beam refinement of the serving base station beam after the UE beam switch to the second UE beam and beginning from the UE beam switch slot.

30. A user equipment (UE), comprising:
a processor configured with processor executable instructions to perform operations comprising:
determining that a UE beam switch is required;
sending to a base station a proactive notification that the UE will perform a beam switch from a first UE beam to a second UE beam in response to determining that a UE beam switch is required;
performing the beam switch from the first UE beam to the second UE beam on a UE beam switch slot;
receiving from the base station control information allocating CSI-RS resources on the UE beam switch slot for a channel state information feedback (CSF) for a channel associated with the second UE beam;
receiving from the base station an aperiodic channel state information reference signal (CSI-RS) using the second UE beam;
determining the CSF comprising information about the channel associated with the second UE beam based on the CSI-RS;
transmitting the CSF to the base station using the allocated CSI-RS resources; and
receiving from the base station an instruction to adjust data communication parameters to be aligned with the channel associated with the second UE beam based at least in part on the transmitted CSF.

* * * * *